(12) United States Patent
David et al.

(10) Patent No.: US 11,668,374 B2
(45) Date of Patent: Jun. 6, 2023

(54) TRACTION DEVICE

(71) Applicant: Dana Limited, Maumee, OH (US)

(72) Inventors: Jeffrey M. David, Cedar Park, TX (US); Daniel J. Dawe, Austin, TX (US); Charles B. Lohr, III, Jonestown, TX (US); Gordon M. McIndoe, Volente, TX (US); Travis J. Miller, Cedar Park, TX (US); Sebastian J. Peters, Cedar Park, TX (US); Patrick R. Sexton, Austin, TX (US)

(73) Assignee: Dana Limited, Maumee, OH (US)

( * ) Notice: Subject to any disclaimer, the term of this patent is extended or adjusted under 35 U.S.C. 154(b) by 0 days.

(21) Appl. No.: 17/651,776

(22) Filed: Feb. 18, 2022

(65) Prior Publication Data

US 2022/0213949 A1 Jul. 7, 2022

Related U.S. Application Data

(63) Continuation of application No. 17/044,811, filed as application No. PCT/US2019/025308 on Apr. 2, 2019, now Pat. No. 11,306,802.

(60) Provisional application No. 62/655,492, filed on Apr. 10, 2018, provisional application No. 62/653,084, filed on Apr. 5, 2018, provisional application No. 62/653,146, filed on Apr. 5, 2018, provisional application No. 62/652,413, filed on Apr. 4, 2018, provisional application No. 62/652,438, filed on Apr. 4, 2018, provisional application No. 62/651,940, filed on Apr. 3, 2018, provisional application No. 62/652,042, filed on Apr. 3, 2018, provisional (Continued)

(51) Int. Cl.
*F16H 15/48* (2006.01)
*F16H 15/50* (2006.01)
*F16H 13/06* (2006.01)

(52) U.S. Cl.
CPC ............. *F16H 15/50* (2013.01); *F16H 13/06* (2013.01); *F16H 15/48* (2013.01)

(58) Field of Classification Search
CPC .......... F16H 15/50; F16H 13/06; F16H 15/48; B60K 6/365; B60K 6/42–445; B60K 6/46; B60K 6/48–4841; B60K 6/485
See application file for complete search history.

(56) References Cited

U.S. PATENT DOCUMENTS 475,702 A * 5/1892 Patton ................... B60K 6/365
290/10
5,385,514 A 1/1995 Dawe
(Continued)

FOREIGN PATENT DOCUMENTS

| CN | 1751172 A | 3/2006 |
| DE | 102012204717 A1 | 9/2013 |

(Continued)

OTHER PUBLICATIONS

ISA European Patent Office, International Search Report and Written Opinion Issued in Application No. PCT/US2019/025308, dated Aug. 30, 2019, WIPO, 26 pages.

*Primary Examiner* — Sherry L Estremsky
(74) *Attorney, Agent, or Firm* — McCoy Russell LLP

(57) ABSTRACT

A traction device including a ring member, a carrier, and a sun member and an electric motor, wherein the electric motor is coupled to at least one of the ring member, the carrier, and the sun member.

16 Claims, 21 Drawing Sheets

Related U.S. Application Data application No. 62/651,518, filed on Apr. 2, 2018, provisional application No. 62/651,459, filed on Apr. 2, 2018.

(56) References Cited

U.S. PATENT DOCUMENTS

| | | | |
|---|---|---|---|
| 5,584,774 A | 12/1996 | Fini, Jr. | |
| 6,086,062 A | 6/2000 | Nakamura et al. | |
| 6,758,680 B2 | 7/2004 | Duquerroy et al. | |
| 7,070,530 B2 | 7/2006 | Ai et al. | |
| 7,172,524 B2 | 2/2007 | Moeller | |
| 7,244,214 B2 | 7/2007 | Shimoyama et al. | |
| 8,091,660 B2 | 1/2012 | Bordini | |
| 8,784,248 B2 * | 7/2014 | Murakami | B60K 6/543 475/5 |
| 9,096,219 B2 * | 8/2015 | Okuwaki | B60W 10/06 |
| 10,161,489 B2 * | 12/2018 | Fujita | F16H 13/06 |
| 10,180,088 B2 | 1/2019 | McCloy | |
| 11,092,214 B2 | 8/2021 | Dawe et al. | |
| 2004/0092353 A1 * | 5/2004 | Moeller | B60W 10/26 903/910 |
| 2009/0242293 A1 | 10/2009 | Tanaka et al. | |
| 2011/0256974 A1 * | 10/2011 | Okuwaki | B60K 6/44 475/5 |
| 2015/0011347 A1 | 1/2015 | Takahashi et al. | |
| 2018/0257478 A1 * | 9/2018 | Haka | B60K 6/543 |
| 2021/0079986 A1 | 3/2021 | Fauteux | |

FOREIGN PATENT DOCUMENTS

| | | | | |
|---|---|---|---|---|
| DE | 102012220970 A1 | 5/2014 | | |
| DE | 102013204227 A1 | 9/2014 | | |
| DE | 102015015006 A1 | 7/2016 | | |
| EP | 0087547 A1 | 9/1983 | | |
| EP | 1086848 A1 | 3/2001 | | |
| EP | 2924317 A1 | 9/2015 | | |
| GB | 2536684 A * | 9/2016 | | F16H 13/06 |
| WO | WO-2017049049 A1 * | 3/2017 | | B60K 6/26 |
| WO | 2017089449 A1 | 6/2017 | | |

* cited by examiner

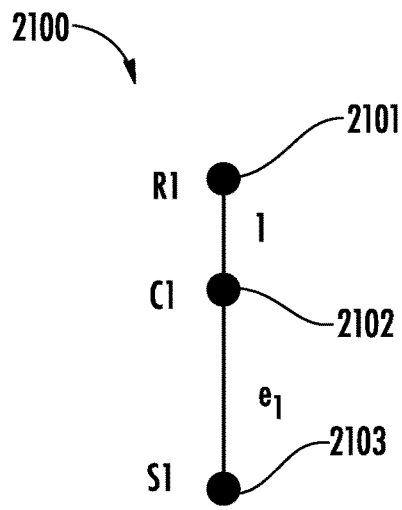
FIG. 17
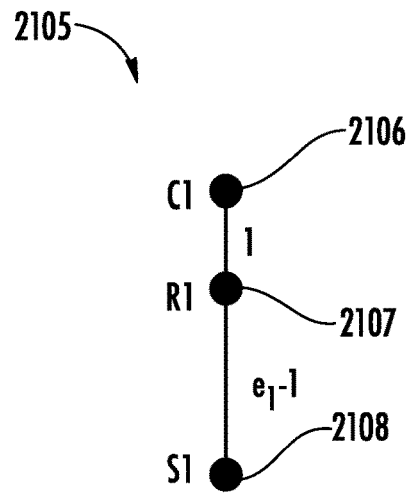
FIG. 18
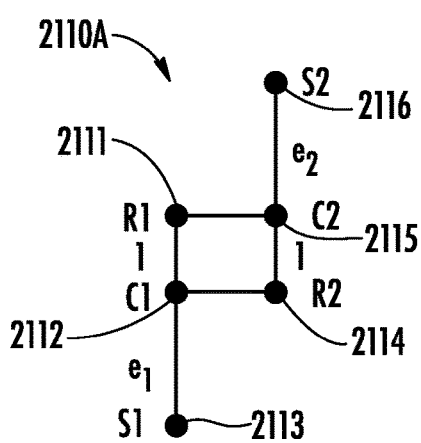
FIG. 19
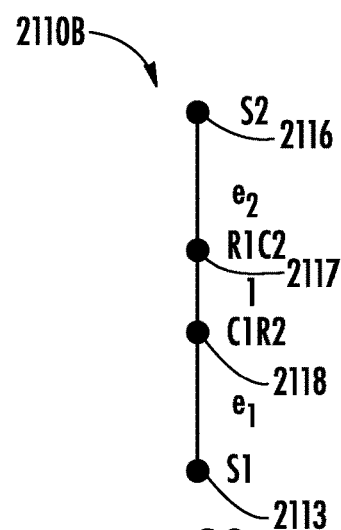
FIG. 20
| | SIMPLE - SIMPLE | | | | | | | | |
|---|---|---|---|---|---|---|---|---|---|
| FIRST CONNECTION | S1S2 | S1C2 | S1R2 | R1R2 | R1C2 | R1S2 | C1R2 | C1S2 | C1C2 |
| SECOND CONNECTION | C1C2 | C1R2 | R1C2 | C1C2 | C1R2 | C1R2 | R1C2 | R1R2 | R1R2 |
| | C1R2 | C1S2 | R1S2 | C1S2 | C1S2 | C1C2 | R1S2 | R1C2 | R1S2 |
| | R1C2 | R1R2 | C1C2 | S1C2 | S1R2 | S1R2 | S1C2 | S1R2 | S1R2 |
| | R1R2 | R1S2 | C1S2 | S1S2 | S1S2 | S1C2 | S1S2 | S1C2 | S1S2 |
FIG. 21

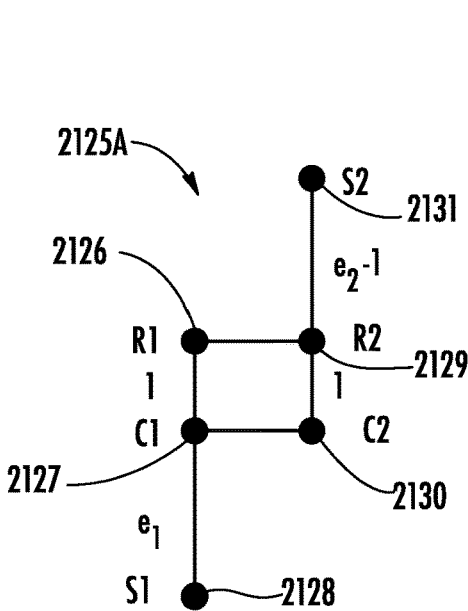
FIG. 22
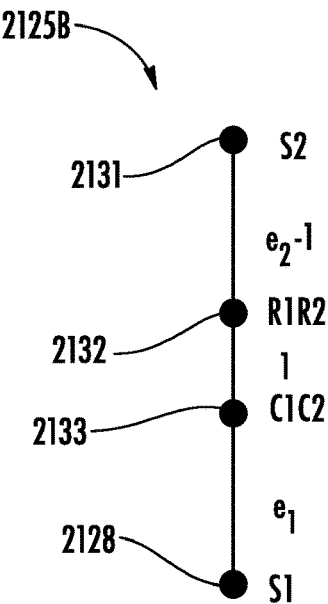
FIG. 23
| | SIMPLE - COMPOUND | | | | | | | | |
|---|---|---|---|---|---|---|---|---|---|
| FIRST CONNECTION | S1S2 | S1C2 | S1R2 | R1R2 | R1C2 | R1S2 | C1R2 | C1S2 | C1C2 |
| SECOND CONNECTION | C1C2 | C1R2 | R1C2 | C1C2 | C1R2 | C1R2 | R1C2 | R1R2 | R1R2 |
| | C1R2 | C1S2 | R1S2 | C1S2 | C1S2 | C1C2 | R1S2 | R1C2 | R1S2 |
| | R1C2 | R1R2 | C1C2 | S1C2 | S1R2 | S1R2 | S1C2 | S1R2 | S1R2 |
| | R1R2 | R1S2 | C1S2 | S1S2 | S1S2 | S1C2 | S1S2 | S1C2 | S1S2 |
FIG. 24
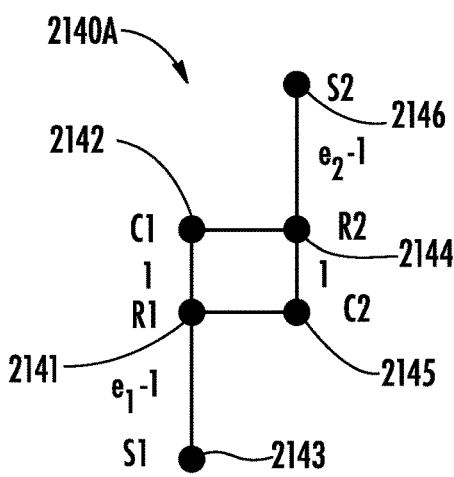
FIG. 25
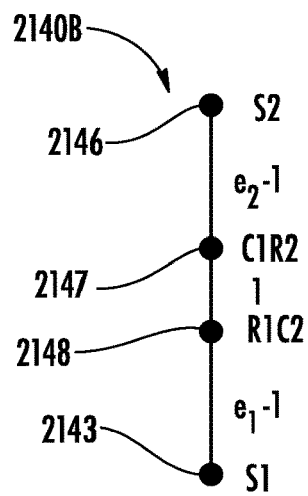
FIG. 26

| | COMPOUND - COMPOUND | | | | | | | | |
|---|---|---|---|---|---|---|---|---|---|
| FIRST CONNECTION | S1S2 | S1C2 | S1R2 | R1R2 | R1C2 | R1S2 | C1R2 | C1S2 | C1C2 |
| SECOND CONNECTION | C1C2 | C1R2 | R1C2 | C1C2 | C1R2 | C1R2 | R1C2 | R1R2 | R1R2 |
| | C1R2 | C1S2 | R1S2 | C1S2 | C1S2 | C1C2 | R1S2 | R1C2 | R1S2 |
| | R1C2 | R1R2 | C1C2 | S1C2 | S1R2 | S1R2 | S1C2 | S1R2 | S1R2 |
| | R1R2 | R1S2 | C1S2 | S1S2 | S1S2 | S1C2 | S1S2 | S1C2 | S1S2 |

| MODE | ENGINE | CL1 | CL2 | CL3 |
|---|---|---|---|---|
| 1 MOTOR EV | | ENGAGED | | |
| 2 MOTOR EV | | | ENGAGED | |
| SERIES | ENGAGED | ENGAGED | | ENGAGED |
| OUTPUT SPLIT | ENGAGED | | ENGAGED | ENGAGED |

TRACTION DEVICE

RELATED APPLICATIONS

The present application is a Continuation of U.S. National Phase application Ser. No. 17/044,811, entitled "TRACTION DEVICE" and filed Oct. 1, 2020. U.S. application Ser. No. 17/044,811 is a National Phase of PCT/US2019/025308, entitled "TRACTION DEVICE," filed Apr. 2, 2019. International Patent Application Serial No. PCT/US2019/025308 claims priority to U.S. Provisional Application Nos. 62/651,459 filed on Apr. 2, 2018; 62/651,518 filed on Apr. 2, 2018; 62/651,940 filed on Apr. 3, 2018; 62/652,042 filed on Apr. 3, 2018; 62/652,413 filed on Apr. 4, 2018; 62/652,438 filed on Apr. 4, 2018; 62/653,084 filed on Apr. 5, 2018; 62/653,146 filed on Apr. 5, 2018; and 62/655,492 filed on Apr. 10, 2018. Each of the above identified applications are fully incorporated by reference herein.

FIELD

The presently disclosed subject matter relates to a vehicle, and more particularly to a traction device for the vehicle.

BACKGROUND

Multi-speed planetary based automatic transmissions with an increasing number of discrete ratios are increasing in popularity and acceptance due in large part to the cost of fuel and greenhouse carbon emission government regulations for internal combustion engine vehicles. Because fuel economy is in part proportional to the total ratio span in the transmission, it is expected that the trend towards a larger number of discrete gears and a wider span will continue.

A conventional geared planetary is limited within a certain ratio range due to issues of manufacturability, pinion speed constraints, noise concerns etc. However, a traction drive transmission device used as a planetary connection in an automatic transmission releases the constraints on ratio range and eliminates the speed and noise concerns associated with geared planetaries. Therefore, an automatic transmission composed of traction planetaries in various combinations and arrangements is capable of achieving a wider span and contains less constraints on the selection of discrete ratios within that range.

SUMMARY

Provided herein may be an electric actuator device including: a traction planetary device having a ring member, a carrier, and a sun member; and an electric motor, wherein the electric motor may be coupled to the carrier.

In certain embodiments of the electric actuator device, the ring member may be configured to transfer rotational power out of the electric actuator device.

In certain embodiments of the electric actuator device, the sun member may be configured to transfer rotational power out of the electric actuator device.

Provided herein may be an electric actuator device including: a traction planetary device having a ring member, a carrier, and a sun member and an electric motor, wherein the electric motor may be coupled to the ring member.

In certain embodiments of the electric actuator device, the carrier may be configured to transfer rotational power out of the electric actuator device.

In certain embodiments of the electric actuator device, the sun member may be configured to transfer rotational power out of the electric actuator device.

Provided herein may be an electric actuator device having: a traction planetary device having a ring member, a carrier, and a sun member; and an electric motor, wherein the electric motor may be coupled to the sun member.

In certain embodiments of the electric actuator device, the ring member may be configured to transfer rotational power out of the electric actuator device.

In certain embodiments of the electric actuator device, the carrier may be configured to transfer rotational power out of the electric actuator device.

Provided herein may be an electric powertrain having: a motor/generator; a first traction drive transmission having a first ring member, a first non-rotatable traction planet carrier configured to support a plurality of traction rollers, and a first sun member coupled to the motor/generator; a second traction drive transmission having a second ring member, a second non-rotatable traction planet carrier, and a second sun member coupled to the first ring member; a first pinion gear having a hollow central bore, the first pinion gear coupled to the second ring member; and a shaft coupled to the second sun member and the first ring member, the shaft passing through the hollow central bore.

In certain embodiments of the electric powertrain, a second pinion gear may be coupled to the first pinion gear, the second pinion gear configured to transmit rotational power.

In certain embodiments of the electric powertrain, the plurality of traction rollers are conical in shape.

In certain embodiments of the electric powertrain, the first pinion gear may be positioned between the motor/generator and the first traction drive transmission.

In certain embodiments of the electric powertrain, the first pinion gear may be positioned between the first traction drive transmission and the second traction drive transmission.

Provided herein may be an electric powertrain having: a first motor/generator; a second motor/generator; and a traction drive transmission having a ring member operably coupled to the first motor/generator, a traction planet carrier configured to support a plurality of traction rollers, the carrier configured to transmit a rotational power, and a sun member operably coupled to the second motor/generator; a first pinion gear having a hollow central bore, the first pinion gear coupled to the traction planet carrier; and a shaft coupled to the sun member and the first motor/generator, the shaft passing through the hollow central bore.

In certain embodiments of the electric powertrain, a second pinion gear may be coupled to the first pinion gear, the second pinion gear configured to transmit rotational power.

In certain embodiments of the electric powertrain, the plurality of traction rollers are conical in shape.

A traction drive transmission including: a ring member having a rotational center aligned along a main axis of the transmission; a first traction roller in contact with the ring member; a sun member having a rotational center offset from the main axis, the sun member in contact with the first traction roller, the sun member located radially inward of the first traction roller; a first floating traction roller in contact with the ring member and the sun member; a first reaction roller in contact with the first floating traction roller; and a carrier configured to support the reaction roller, the carrier configured to be non-rotatable.

In certain embodiments, the carrier may be configured to support the first traction roller.

In certain embodiments, the traction drive transmission has a second reaction roller supported in the carrier.

In certain embodiments, the traction drive transmission has a second floating roller in contact with the second reaction roller.

Provided herein may be a high-ratio traction drive transmission including: a first high-ratio simple planetary traction drive transmission having a first ring member, a first carrier, and a first sun member; and a second high-ratio simple planetary traction drive transmission having a second ring member, a second carrier, and a second sun member. The first high-ratio simple planetary traction drive transmission may be operably coupled to the second high-ratio simple planetary traction drive transmission forming a first connection and a second connection.

Provided herein may be a high-ratio traction drive transmission including: a high-ratio simple planetary traction drive transmission having a first ring member, a first carrier, and a first sun member; and a high-ratio compound planetary traction drive transmission having a second ring member, a second carrier, and a second sun member. The high-ratio simple planetary traction drive transmission may be operably coupled to the high-ratio compound planetary traction drive transmission forming a first connection and a second connection.

Provided herein may be a high-ratio traction drive transmission having: a first high-ratio compound planetary traction drive transmission having a first ring member, a first carrier, and a first sun member; and a second high-ratio compound planetary traction drive transmission having a second ring member, a second carrier, and a second sun member. The first high-ratio compound planetary traction drive transmission may be operably coupled to the second high-ratio compound planetary traction drive transmission forming a first connection and a second connection.

Provided herein may be a continuously variable electric drivetrain including: a first motor/generator; a second motor/generator; and a high-ratio traction drive transmission having a ring member operably coupled to the first motor/generator, a carrier configured to support a plurality of traction rollers, the carrier configured to transmit a rotational power, and a sun member operably coupled to the second motor/generator.

In certain embodiments of the continuously variable electric drivetrain, a first transfer gear may be coupled to the first motor/generator and the ring member.

In certain embodiments of the continuously variable electric drivetrain, a second transfer gear may be coupled to the second motor/generator and the sun member.

In certain embodiments of the continuously variable electric drivetrain, the plurality of traction rollers are conical in shape.

In certain embodiments of the continuously variable electric drivetrain, the first motor/generator may be operated in a low-speed, high-torque mode.

In certain embodiments of the continuously variable electric drivetrain, the first motor/generator may be operated in a high-speed, low-torque mode.

Provided herein may be a method of controlling a continuously variable electric drivetrain including a first motor/generator, a second motor/generator, and a high-ratio traction drive transmission having a ring member operably coupled to the first motor/generator, a carrier configured to support a plurality of traction rollers and configured to transmit a rotational power, and a sun member operably coupled to the second motor/generator. The method includes the steps of: receiving a carrier speed signal, a target first motor/generator speed signal, and a target axle torque signal; determining a first motor/generator torque command based at least in part on the target axle torque signal; and determining a second motor/generator speed command based at least in part on the carrier speed signal and the target first motor/generator speed signal.

In certain embodiments, the step of determining a first motor/generator torque command based at least in part on the target axle torque signal includes applying a limit to the torque of the first motor/generator.

In certain embodiments, the step of determining a second motor/generator speed command based at least in part on the carrier speed signal and the target first motor/generator speed signal includes applying a limit to the speed of the second motor/generator.

Provided herein may be an electric hybrid powertrain including an engine, a first motor/generator, a second motor/generator, and a traction drive transmission operably coupled to the first motor/generator and the second motor/generator. The traction drive transmission includes a ring member, a rotatable traction roller carrier, and a sun member.

In certain embodiments of the electric hybrid powertrain, a first clutch may be configured to selectively couple the ring member to a ground.

In certain embodiments of the electric hybrid powertrain, a second clutch may be configured to selectively couple the ring member and the first motor/generator.

In certain embodiments of the electric hybrid powertrain, the second motor/generator may be coupled to the sun member.

In certain embodiments of the electric hybrid powertrain, a third clutch may be configured to selectively couple the engine to the first motor/generator.

Provided herein may be an electric hybrid powertrain including an engine, a first motor/generator, a second motor/generator, and a traction drive transmission operably coupled to the first motor/generator and the second motor/generator. The traction drive transmission includes a ring member operably coupled to the second motor/generator, a rotatable traction roller carrier operably coupled to the engine, and a sun member operably coupled to the first motor/generator.

Provided herein in may be an electric hybrid powertrain including an engine, a first motor/generator, a second motor/generator, a first traction drive transmission and a second traction drive transmission. The first traction drive transmission includes a first ring member operably coupled to the engine, a first rotatable traction roller carrier, and a first sun member operably coupled to the first motor/generator. The second traction drive transmission includes a second ring member selectively coupled to the first sun member, a second rotatable traction roller carrier operably coupled to the first rotatable traction roller carrier, and a second sun member operably coupled to the second motor/generator.

In certain embodiments of the electric hybrid powertrain, the second ring member may be selectively coupled to the first sun member through a first clutch.

In certain embodiments of the electric hybrid powertrain, the second ring member may be selectively coupled to ground through a second clutch.

Provided herein may be an electric hybrid powertrain including: an engine; a first motor/generator; a second motor/generator; a planetary gear set having a ring gear, a planet carrier operably coupled to the engine, and a sun gear coupled to the first motor generator; and a traction transmission operably coupled to the second motor/generator and the ring gear.

In certain embodiments of the electric hybrid powertrain, the traction transmission further includes a ring member coupled to the ring gear, a non-rotatable traction planet carrier, and a sun member coupled to the second motor/generator.

In certain embodiments of the electric hybrid powertrain, a one-way clutch may be coupled to the engine and the planet carrier.

In certain embodiments of the electric hybrid powertrain, the traction transmission may be an off-set type traction transmission.

In certain embodiments of the electric hybrid powertrain, the traction transmission may be provided with conical traction rollers supported in the non-rotatable traction planet carrier.

A traction drive transmission including: a ring member having a rotational center aligned along a main axis of the transmission; a first traction roller in contact with the ring member; a sun member having a rotational center offset from the main axis, the sun member in contact with the first traction roller, the sun member located radially inward of the first traction roller; a first floating traction roller in contact with the ring member and the sun member; a first reaction roller in contact with the first floating traction roller; and a carrier configured to support the reaction roller, the carrier configured to be non-rotatable.

In certain embodiments, the carrier may be configured to support the first traction roller.

In certain embodiments, the traction drive transmission has a second reaction roller supported in the carrier.

In certain embodiments, the traction drive transmission has a second floating roller in contact with the second reaction roller.

Provided herein may be a gear set including: a first gear having a first set of helical teeth and a first tapered traction roller; a second gear having a second set of helical teeth and a second tapered traction roller; wherein the first set of helical teeth engage the second set of helical teeth; and wherein the first tapered traction roller may be coupled to the second tapered traction roller to form a traction surface.

Provided herein a traction drive including a first traction roller having a outer periphery and a second traction roller having an outer periphery. The first traction roller may be in contact with the second traction roller at a traction contact. The traction contact forms a traction contact path on the outer periphery of the first traction roller in a non-linear pattern.

In certain embodiments, the first traction roller further includes a raised traction surface located on the outer periphery, wherein the axial location of the traction surface with respect to the outer periphery may be non-linear.

The accompanying drawings are incorporated herein as part of the specification. The drawings described herein illustrate embodiments of the presently disclosed subject matter, and are illustrative of selected principles and teaching of the present disclosure and do not illustrate all possible implementations thereof. The drawings are not intended to limit the scope of the present disclosure in any way.

BRIEF DESCRIPTION OF THE FIGURES

FIG. 17 is a lever diagram of a high-ratio simple planetary traction drive transmission;

FIG. 18 is a lever diagram of a high-ratio compound planetary traction drive transmission;

FIG. 19 is a lever diagram of a high-ratio simple planetary traction drive transmission coupled to another high-ratio simple planetary transmission;

FIG. 20 is a simplified lever diagram of the configuration of FIG. 19;

FIG. 21 is a table depicting component couplings of a high-ratio simple planetary traction drive transmission coupled to another high-ratio simple planetary transmission;

FIG. 22 is a lever diagram of a high-ratio simple planetary traction drive transmission coupled to a high-ratio compound planetary transmission;

FIG. 23 is a simplified lever diagram of the configuration of FIG. 22;

FIG. 24 is a table depicting component couplings of a high-ratio simple planetary traction drive transmission coupled to a high-ratio compound planetary transmission;

FIG. 25 is a lever diagram of a high-ratio compound planetary traction drive transmission coupled to another high-ratio compound planetary transmission;

FIG. 26 is a simplified lever diagram of the configuration of FIG. 25;

DETAILED DESCRIPTION

Figure 1:
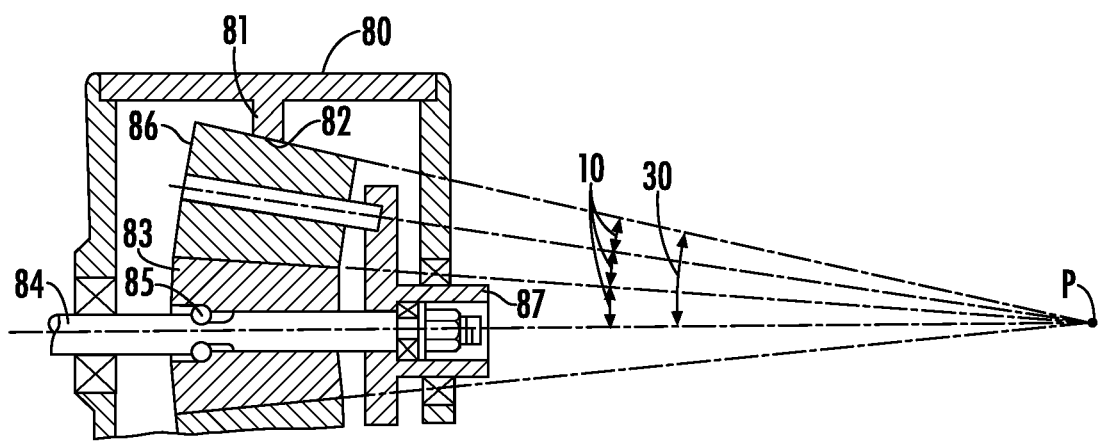
FIG. 1 is a cross-sectional view of a simplified traction planetary device having a tapered roller.

It may be to be understood that the presently disclosed subject matter may assume various alternative orientations and step sequences, except where expressly specified to the contrary. It may be also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Provided herein are configurations of actuation devices implementing a traction planetary device and configurations of electric powertrains implementing traction drive transmissions. Actuation devices and powertrains implementing electric motors are faced with a large speed reduction between the electric motor and the driven device (e.g. driven wheels). In some cases, electric machines and electric motors having high rotational speeds, for example higher than 30,000 rpm, are being considered for implementation in a variety of actuation devise and powertrain configurations. It may be appreciated that traditional gearing devices with high transmission ratios, for example, those with transmission ratios in the range of 25-40, are needed for implementation of some types of actuation devices and high-speed electric machines. However, traditional toothed gearing having transmission ratios in said range are prohibitively expensive to manufacture and often are prohibitively noisy during operation.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It may be noted that in using said terms to describe inventive embodiments, specific structures or mechanisms that link or couple the elements are typically described. However, unless otherwise specifically stated, when one of said terms may be used, the term indicates that the actual linkage or coupling may be capable of taking a variety of forms, which in certain instances will be readily apparent to a person of ordinary skill in the relevant technology.

It should be noted that reference herein to "traction" does not exclude applications where the dominant or exclusive mode of power transfer may be through "friction." Without attempting to establish a categorical difference between traction and friction drives here, generally these will be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction force which would be available at the interfaces of the contacting components and may be the ratio of the maximum available drive torque per contact force. Typically, friction drives generally relate to transferring power between two elements by frictional forces between the elements. For the purposes of this disclosure, it should be understood that the traction planetaries described here are capable of operating in both tractive and frictional applications based on the torque and speed conditions present during operation.

Referring to FIG. 1, in certain embodiments, traction drive transmissions (e.g. a high-ratio traction drive transmission) are characterized by having an arrangement providing a spin free traction roller engagement.

In certain embodiments, the transmission includes a transmission housing 80 provided with a race ring 81 having a race surface 82. A slightly conical sun roller 83 may be supported on an input shaft 84 by way of a cam structure 85 and slightly conical planetary rollers 86 are supported for orbiting with an output shaft 87 and are in engagement with the race ring 81 and the sun roller 83. The cam structure 85 may be configured to force the sun roller 83 between the planetary rollers 86 to provide traction surface engagement forces depending on the amount of torque transmitted. As shown, all axial tangents of all the traction surfaces intersect in a single point P on a transmission axis be so that true rolling conditions are provided for all traction surfaces. This results in high-efficiency operation of the transmission and little wear of the traction surfaces.

Figure 2:
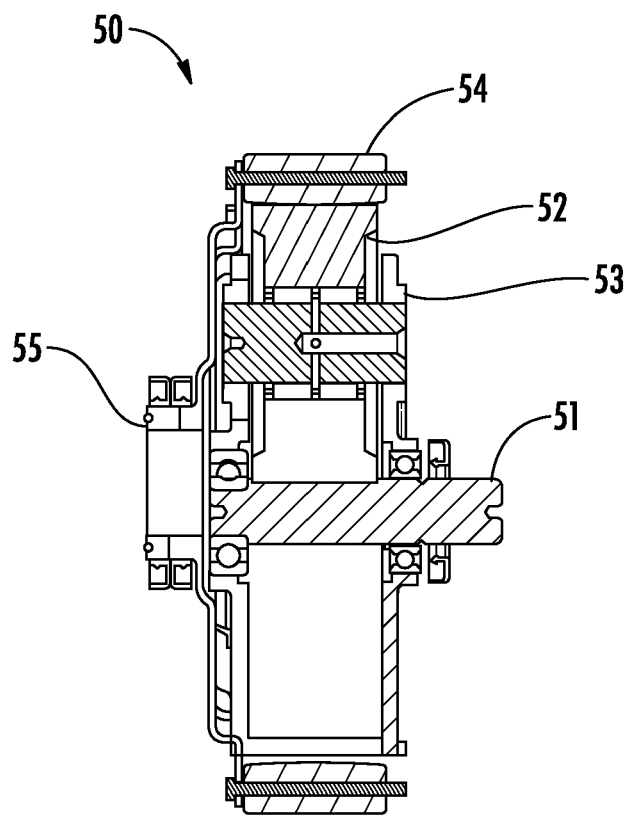
FIG. 2 is a cross-sectional view of an embodiment of a high-ratio traction drive transmission of an offset traction roller transmission type.
Figure 3:
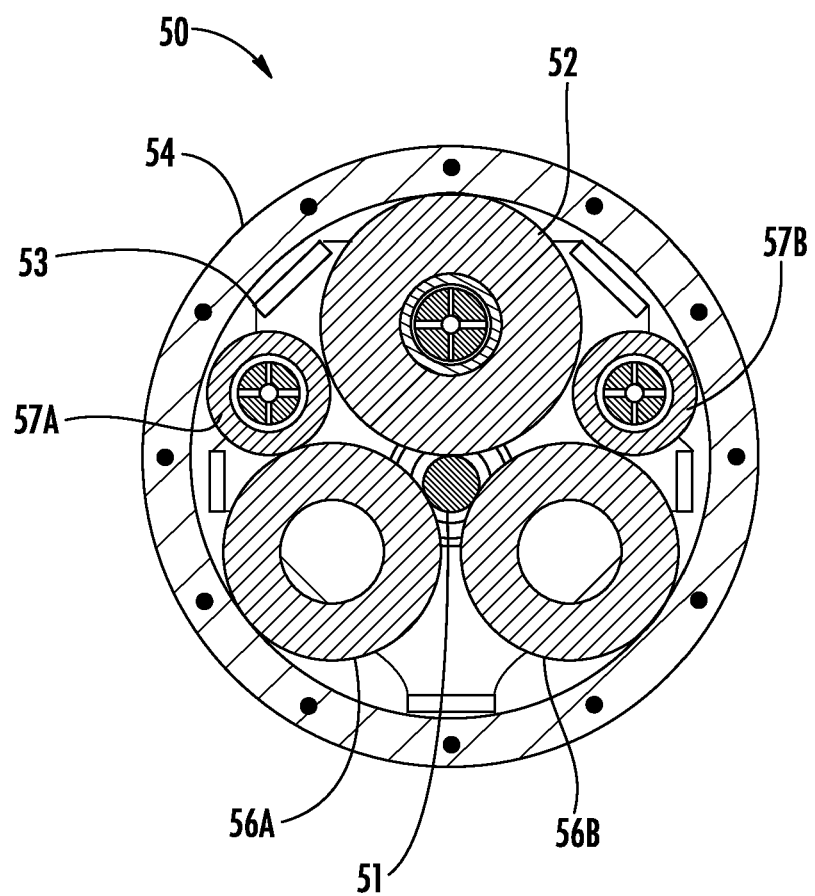
FIG. 3 is a cross-section plan view of the offset-type traction roller transmission type of FIG. 2.

Referring to FIGS. 2 and 3, in certain embodiments, a traction drive transmission 50 (e.g. a high-ratio traction drive transmission) includes a sun roller 51 in traction engagement with a traction roller 52. The traction roller 52 may be supported in a non-rotatable carrier 53. The traction roller 52 may be in traction engagement with a traction ring 54. The traction ring 54 may be located radially outward of the traction roller 52 and the sun roller 51. In certain embodiments, a ring coupling 55 may be coupled to the traction ring 54 and configured to transmit rotational power in or out of the transmission 50. In certain embodiments, the axis be of the sun roller 51 may be offset radially with respect to the rotational center of the traction roller 52 when viewed in the plane of the page of FIG. 2.

In certain embodiments, the transmission 50 may be provided with a set of floating traction rollers 56 (labeled as "56A" and "56B" in FIG. 3) coupled to the sun roller 51. In certain embodiments, the transmission 50 may also be provided with a set of reaction rollers 57 (labeled as "57A" and "57B" in FIG. 3) supported in the carrier 53 by support bearings. In certain embodiments, the traction roller 52 may be supported in the carrier 53 by a support bearing. In other embodiments, the traction roller 52 may be supported by the sun roller 51 and the reaction rollers 57.

During operation of the transmission 50, the reaction rollers 57 provide torque dependent pressure to the floating traction rollers 56 which may be transferred to the traction ring 54 and the traction roller 52 to thereby transmit torque through traction contact.

Figure 4:
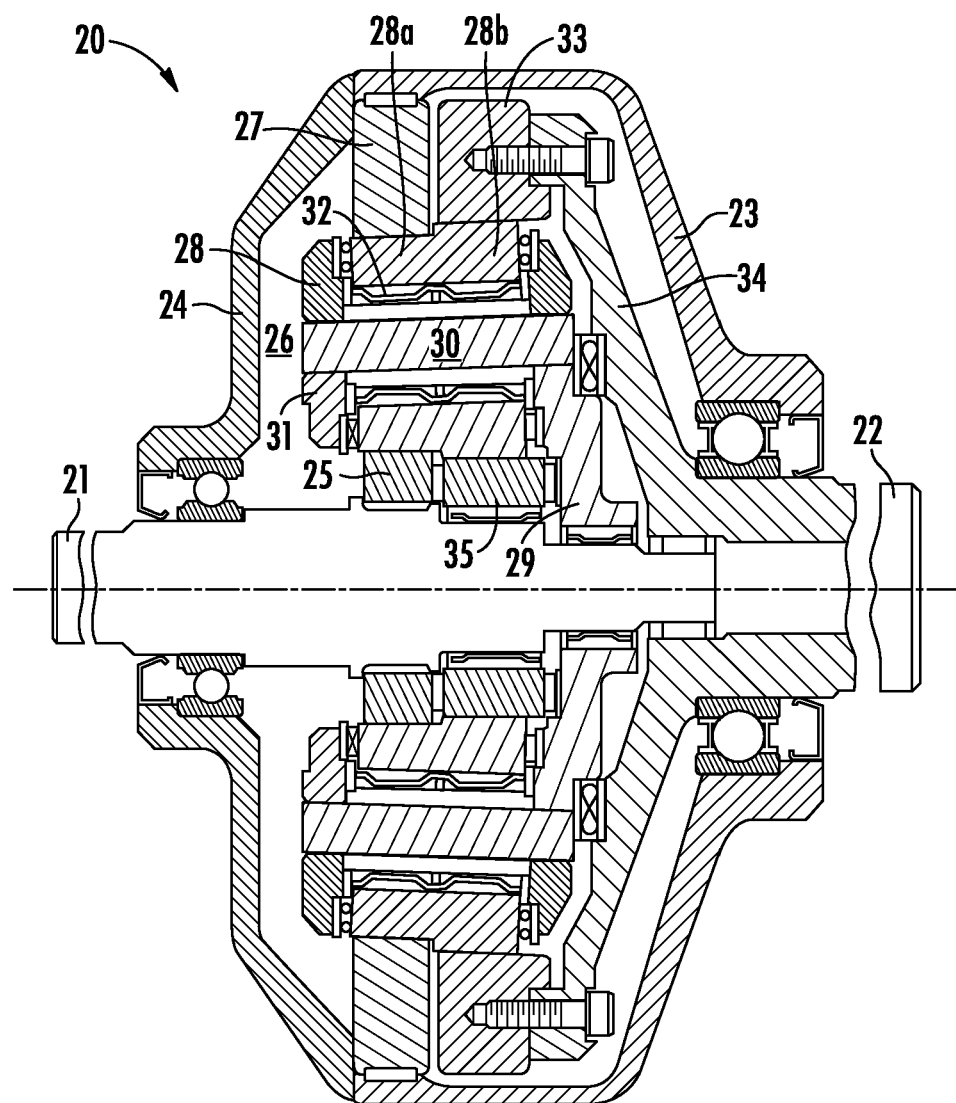
FIG. 4 is a cross-sectional view of an embodiment of a high-ratio traction drive transmission of a tapered planetary traction roller transmission type.

Referring now to FIG. 4, in certain embodiments, a traction drive transmission 20 (e.g. a high-ratio traction drive transmission) includes a coaxial input and output shafts 21 and 22 rotatably supported in a housing 23 and a housing cover 24. In certain embodiments, the input shaft 21 has a sun roller 25 mounted thereon which forms the center roller of a first planetary traction roller 26 including a stationary first traction ring 27 arranged radially outward of the sun roller 25. A set of planetary type traction rollers 28 may be disposed in the space between the first traction ring 27 and the sun roller 25 and in motion-transmitting engagement with both of them. The planetary traction rollers 28 are rotatably supported on a first planetary roller carrier 29.

The traction drive transmission 20 includes for each planetary traction roller 28 a support shaft 30 which may be supported at its free end by a support ring 31 and on which the planetary traction roller 28 may be supported by a bearing 32. In certain embodiments, the planetary traction rollers 28 include two sections, a first section 28a and a second section 28b of different diameters. The first section 28a may be in engagement with the first traction ring 27 and the sun roller 25. The second section 28b may be in engagement with a second traction ring 33, which may be mounted for rotation with the output shaft 22 via a support disc 34. In certain embodiments, the second section 28b may be coupled to a support sun roller 35 which may be hollow so that the input shaft 21 may extend there through.

Various axial thrust bearings are provided for the accommodation of the axial forces in the transmission. It may be noted, however, that the support shafts 30 of the planetary traction rollers 28 are arranged at a slight angle with respect to an axis of the input and output shafts and that the traction surfaces of the planetary traction rollers 28 are slightly conical. The traction surfaces of the stationary first traction ring 27 and of the rotatable second traction ring 34 are correspondingly conical so that the planetary traction rollers 28 are forced into the conical space defined by the traction rings upon assembly of the transmission.

Referring now to FIGS. 5-10, modern vehicles are equipped with a number of electric actuator devices to provide functionality to the vehicle ranging from seat adjustment, powertrain controls, and a number of other accessory functions. In certain embodiments, the electric actuator devices are typically electric motors coupled to a driven object. These devices add to the overall weight of the vehicle, therefore, there may be a need to address methods for reducing the size of these actuator devices. In particular, certain transmissions require actuation devices to shift ratio. For example, a ball-type continuously variable transmission may employ electric motor actuator devices to shift one carrier member with respect to the other. Described herein are configurations of electric motor actuator devices and traction planetary devices that are implementable in vehicles.

Figure 5:
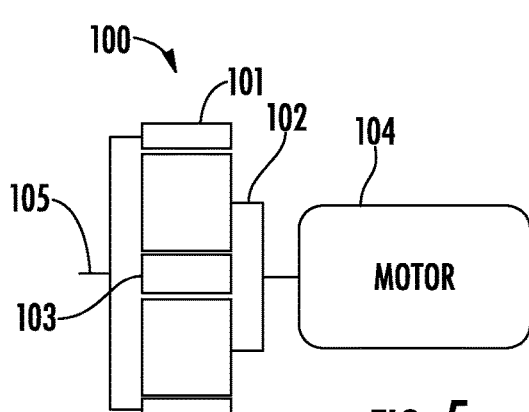
FIG. 5 is a schematic diagram of an embodiment of a traction planetary device coupled to an actuator motor.

Referring now to FIG. 5, in certain embodiments, an electric actuator device includes a traction planetary device 100 provided with a ring member 101 configured to transfer rotational power through an output shaft 105. The ring member 101 may be coupled to a number of traction rollers supported in a carrier 102. The carrier 102 may be coupled to an electric motor 104. The traction planetary device 100 includes a sun member 103 coupled to the traction rollers supported in the carrier 102.

Figure 6:
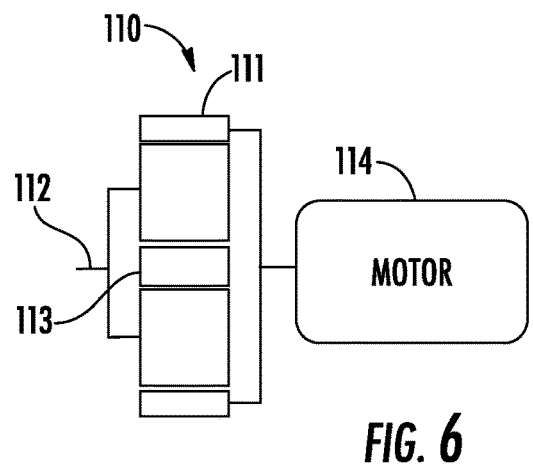
FIG. 6 is a schematic diagram of another embodiment of a traction planetary device coupled to an actuator motor.

Referring now to FIG. 6, in certain embodiments, the electric actuator device includes a traction planetary device 110 provided with a ring member 111 coupled to an electric motor 114. The ring member 101 may be coupled to a number of traction rollers supported in a carrier 112. The carrier 112 may be configured to transfer rotation power to a driven device. The traction planetary device 110 includes a sun member 113 coupled to the traction roller supported in the carrier 112.

Figure 7:
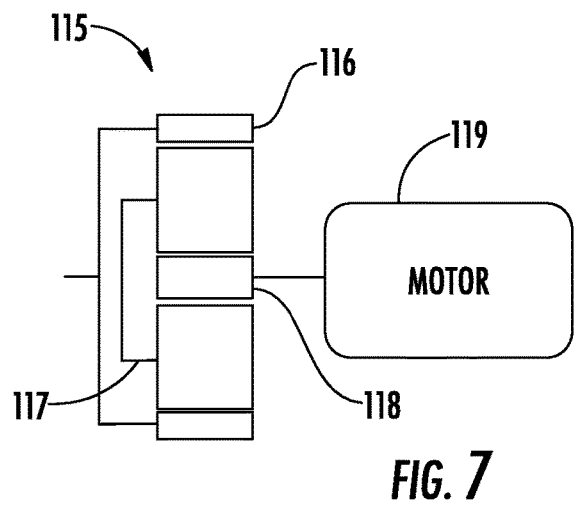
FIG. 7 is a schematic diagram of another embodiment of a traction planetary device coupled to an actuator motor.

Referring now to FIG. 7, in certain embodiments, the electric actuator device includes a traction planetary device 115 provided with a ring member 116 configured to transfer rotational power to a driven device. The ring member 116 may be coupled to a number of traction rollers supported in a carrier 117. The traction planetary device 115 includes a sun member 118 coupled to an electric motor 119.

Figure 8:
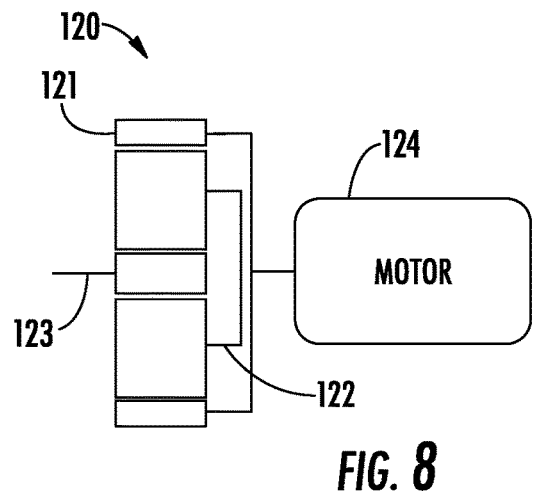
FIG. 8 is a schematic diagram of another embodiment of a traction planetary device coupled to an actuator motor.

Referring now to FIG. 8, in certain embodiments, the electric actuator device includes a traction planetary device 120 provided with a ring member 121 coupled to an electric motor 124. The ring member 121 may be coupled to a number of traction rollers supported in a carrier 122. The traction planetary device 120 includes a sun member 123 configured to transfer rotational power to a driven device.

Figure 9:
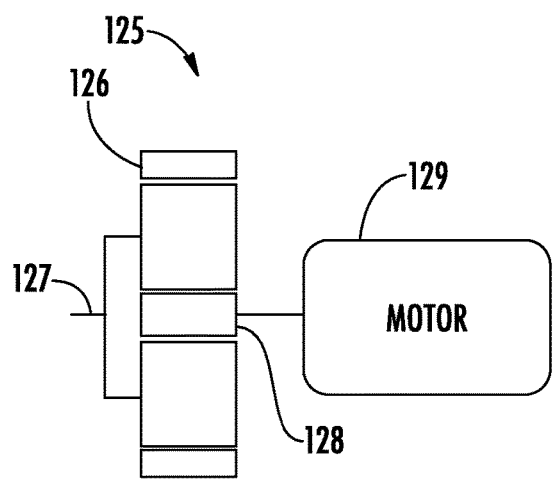
FIG. 9 is a schematic diagram of another embodiment of a traction planetary device coupled to an actuator motor.

Referring now to FIG. 9, in certain embodiments, the electric actuator device includes a traction planetary device 125 may be provided with a ring member 126 coupled to a number of traction rollers supported in a carrier 127. The carrier 127 may be configured to transfer rotational power to a driven device. The traction planetary device 125 includes a sun member 128 coupled to an electric motor 129.

Figure 10:
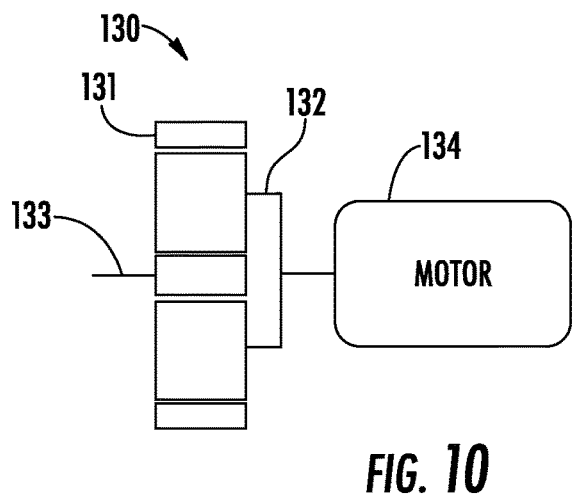
FIG. 10 is a schematic diagram of yet another embodiment of a traction planetary device coupled to an actuator motor.

Referring now to FIG. 10, in certain embodiments, the electric actuator device includes a traction planetary device 130 may be provided with a ring member 131 coupled to a number of traction rollers supported in a carrier 132. The carrier 132 may be coupled to an electric motor 134. The traction planetary device 130 includes a sun member 133 configured to transfer rotational power to a driven device.

It should be appreciated that the embodiments described herein may be configured with multiple planetary sets, of the traction type or of conventional geared typed, to increase the gear ratio beyond the range of a single traction planetary.

Figure 11:
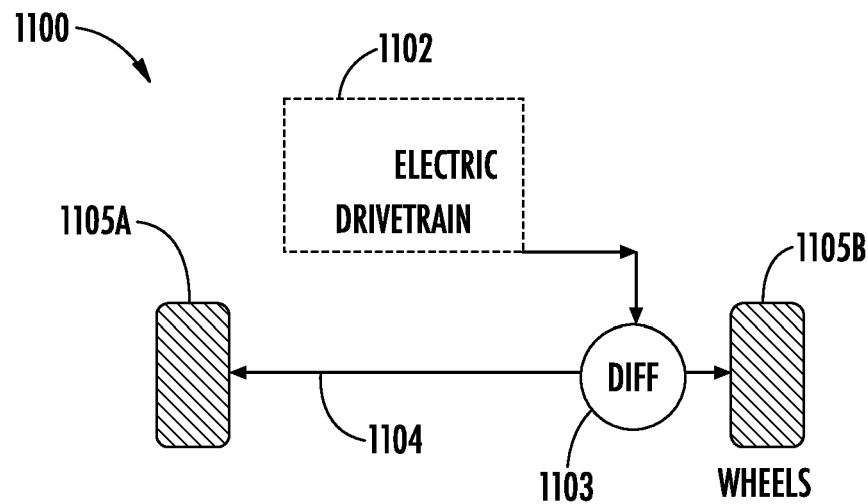
FIG. 11 is a schematic illustration of an electric axle having an electric drivetrain or powertrain.

Referring to FIG. 11, in certain embodiments, an electric axle powertrain 1100 includes an electric drivetrain or powertrain 1102 operably coupled to a differential 1103. In certain embodiments, the differential 1103 may be a common differential gear set implemented to transmit rotational power. The differential 1103 may be operably coupled to a wheel drive axle 1104 configured to drive a set of vehicle wheels 1105 (labeled as "1105A" and "1105B" in FIG. 5).

Figure 12:
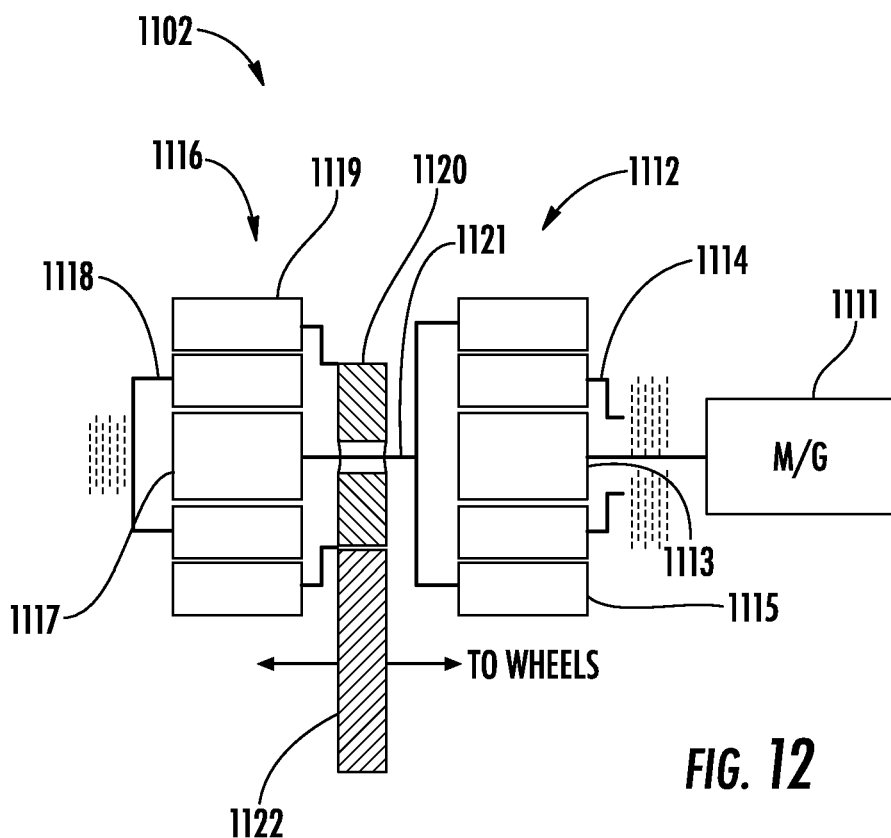
FIG. 12 is a schematic diagram of an electric axle having a motor/generator and two traction drive transmissions.

Referring now to FIG. 12, in one embodiment, the electric drivetrain or powertrain 1102 includes a motor/generator 1111 coupled to a first traction drive transmission 1112. In certain embodiments, the first traction drive transmission 1112 includes a first sun member 1113 coupled to the motor/generator 1111, a first traction planet carrier 1114 coupled to a grounded component such as a housing (not shown), and a first ring member 1115 coupled to a second traction drive transmission 1116.

In certain embodiments, the second traction drive transmission 1116 includes a second sun member 1117 coupled to the first ring member 1115, a second traction planet carrier 1118 coupled to a grounded component such as a housing (not shown), and a second ring member 1119 coupled to a first pinion gear 1120. In certain embodiments, the first pinion gear 1120 has a center bore through which a shaft 1121 may pass to thereby couple the first ring member 1115 to the second sun member 1117. In certain embodiments, the first pinion gear 1120 may be coupled to a second pinion gear 1122 to transmit power out of the electric drivetrain or powertrain 1102. In certain embodiments, the first pinion gear 1120 and the second pinion gear 1122 are positioned between the first traction drive transmission 1112 and the second traction drive transmission 1116.

Figure 13:
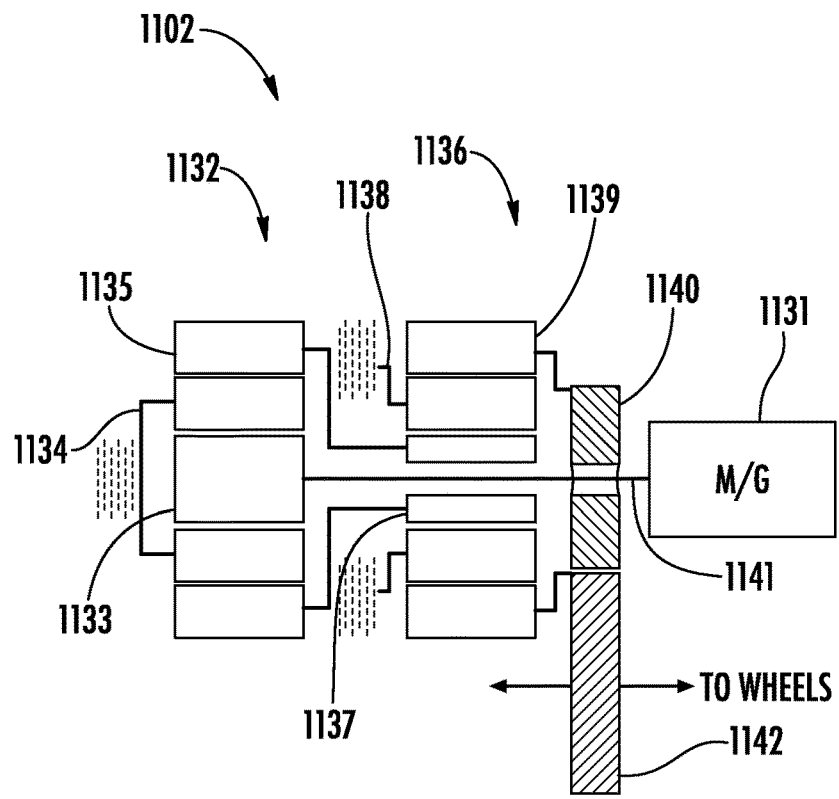
FIG. 13 is a schematic diagram of another electric axle having a motor/generator and two traction drive transmissions.

Referring now to FIG. 13, in another embodiment, the electric drivetrain or powertrain 1102 includes a motor/generator 1131 coupled to a first traction drive transmission 1132. In certain embodiments, the first traction drive transmission 1132 includes a first sun member 1133 coupled to the motor/generator 1131, a first traction planet carrier 1134 coupled to a grounded component such as a housing (not shown), and a first ring member 1135 coupled to a second traction drive transmission 1136.

In certain embodiments, the second traction drive transmission 1136 includes a second sun member 1137 coupled to the first ring member 1135, a second traction planet carrier 1138 coupled to a grounded component such as a housing (not shown), and a second ring member 1139 coupled to a first pinion gear 1140. In certain embodiments, the first pinion gear 1140 has a center bore through which a shaft 1141 may pass to thereby couple the first ring member 1135 to the second sun member 1137. In certain embodiments, the first pinion gear 1140 may be coupled to a second pinion gear 1142 to transmit power out of the electric drivetrain or powertrain 1102. In certain embodiments, the first pinion gear 1140 and the second pinion gear 1142 are positioned between the motor 1131 and the first traction drive transmission 1132 or the second traction drive transmission 1136.

Figure 14:
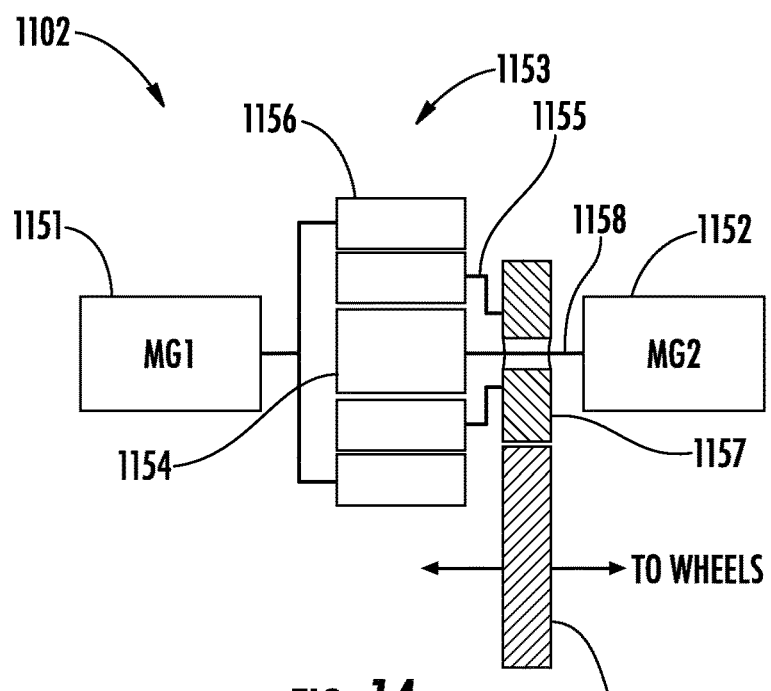
FIG. 14 is a schematic diagram of an electric axle having a traction drive transmission and two motor/generators.

Referring now to FIG. 14, in another embodiment, the electric drivetrain or powertrain 1102 includes a first motor/generator 1151, a second motor/generator 152, and a traction drive transmission 1153. It is understood that for the embodiment shown in FIG. 14, the electric drivetrain or powertrain 1102 may be a variable electric drivetrain or powertrain, if desired. In certain embodiments, the traction drive transmission 1153 includes a sun member 1154 coupled to the second motor/generator 1152, a traction planet carrier 1155, and a ring member 1156 coupled to the first motor/generator 1151. In certain embodiments, the traction planet carrier 1155 may be coupled to a first pinion gear 1157. The first pinion gear 1157 may be provided with a center bore through which a shaft 1158 may pass to couple the second motor/generator 1152 to the sun member 1154. In certain embodiments, the first pinion gear 1157 may be coupled to a second pinion gear 1159 to transmit power out of the electric drivetrain or powertrain 1102.

Figure 15:
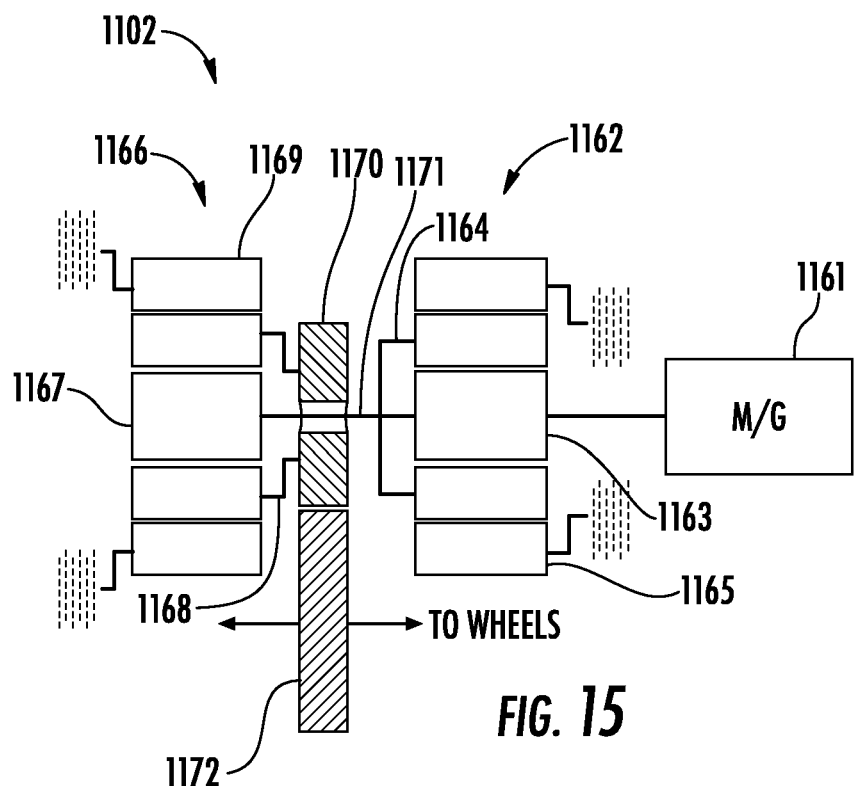
FIG. 15 is a schematic diagram of another electric axle having a motor/generator and two traction drive transmissions.

Referring now to FIG. 15, in another embodiment, the electric drivetrain or powertrain 1102 includes a motor/generator 1161 coupled to a first traction drive transmission 1162. In certain embodiments, the first traction drive transmission 1162 includes a first sun member 1163 coupled to the motor/generator 1161, a first traction planet carrier 1164 coupled to a second traction drive transmission 1166, and a first ring member 1165 coupled to a grounded component such as a housing (not shown). In certain embodiments, the second traction drive transmission 1166 includes a second sun member 1167 coupled to the first traction planet carrier 1164, a second traction planet carrier 1168 coupled to a first pinion gear 1170, and a second ring member 1169 coupled to a grounded component such as a housing (not shown). In certain embodiments, the first pinion gear 1170 has a center bore through which a shaft 1171 may pass to thereby couple the first traction planet carrier 1164 to the second sun member 1167.

In certain embodiments, the first pinion gear 1170 may be coupled to a second pinion gear 1172 to transmit power out of the electric drivetrain or powertrain 1102. In certain embodiments, the first pinion gear 1170 and the second pinion gear 1172 are positioned between the first traction drive transmission 1162 and the second traction drive transmission 1166. It should be appreciated that the electric drivetrain or powertrain 1102 may be configurable in a variety of arrangements including, but not limited to, the first traction drive transmission 1162 having a fixed first traction planet carrier 1164 and a rotatable first ring member 1165. In certain embodiments, the second traction drive transmission 1166 may be configured to have a fixed second traction planet carrier 1168 and a rotatable second ring member 1169.

Figure 16:
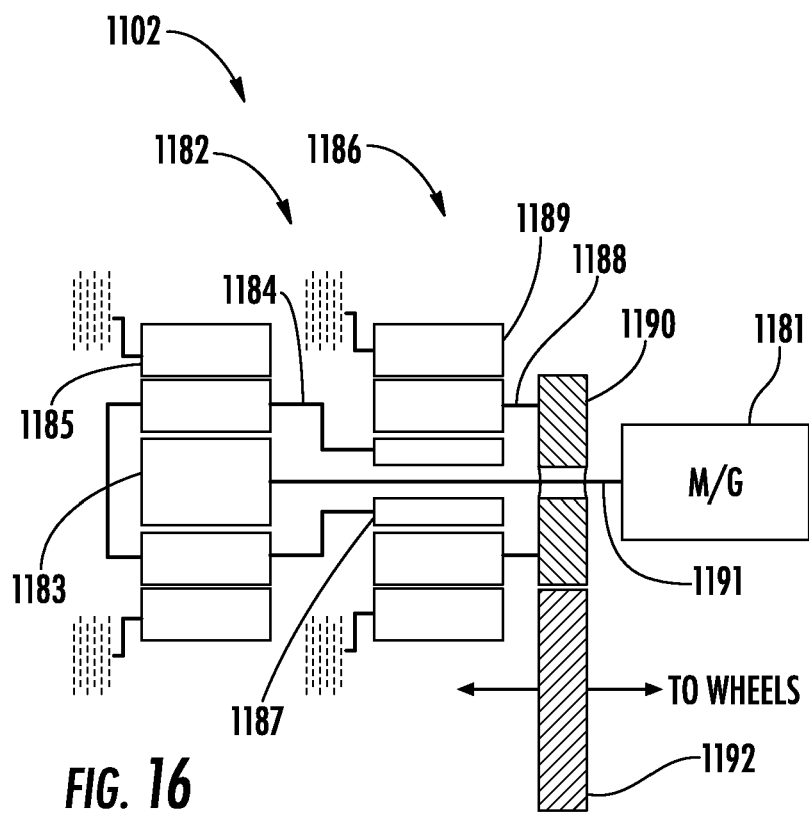
FIG. 16 is a schematic diagram of yet another electric axle having a motor/generator and two traction drive transmissions.

Referring now to FIG. 16, in another embodiment, the electric drivetrain or powertrain 1102 includes a motor/generator 1181 coupled to a first traction drive transmission 1182. In certain embodiments, the first traction drive transmission 1182 includes a first sun member 1183 coupled to the motor/generator 1181, a first traction planet carrier 1184 coupled to a second traction drive transmission 1186, and a first ring member 1185 coupled to a grounded component such as a housing (not shown). In certain embodiments, the second traction drive transmission 1186 includes a second sun member 1187 coupled to the first traction planet carrier 1184, a second traction planet carrier 1188 coupled to a first pinion gear 1190, and a second ring member 1189 coupled to a grounded component such as a housing (not shown). In certain embodiments, the first pinion gear 1190 has a center bore through which a shaft 1191 may pass to thereby couple the first ring member 1185 to the second sun member 1187.

In certain embodiments, the first pinion gear 1190 may be coupled to a second pinion gear 1192 to transmit power out of the electric drivetrain or powertrain 1102. In certain embodiments, the first pinion gear 1190 and the second pinion gear 1192 are positioned between the motor 1181 and the first traction drive transmission 1182 or the second traction drive transmission 1186. It should be appreciated that the electric drivetrain or powertrain 1102 may be configurable in a variety of arrangements including, but not limited to, the first traction drive transmission 1182 having a fixed first traction planet carrier 1184 and a rotatable first ring member 1185. In certain embodiments, the second traction drive transmission 1186 may be configured to have a fixed second traction planet carrier 1188 and a rotatable second ring member 1189.

Referring to FIGS. 17-27, for purposes of description, schematics referred to as lever diagrams are used herein. A lever diagram, also known as a lever analogy diagram, may be a translational-system representation of rotating parts for a planetary gear system. In certain embodiments, a lever diagram may be provided as a visual aid in describing the functions of the transmission. In a lever diagram, a planetary gear set may be often represented by a single vertical line ("lever"). The input, output, and reaction torques are represented by horizontal forces on the lever. The lever motion, relative to the reaction point, represents direction of rotational velocities. For example, a typical planetary gear set having a ring gear, a planet carrier, and a sun gear may be represented by a vertical line having nodes "R1" representing the ring member, node "S1" representing the sun member, and node "C1" representing the carrier. A compound lever may be represented similarly in a lever diagram, except that because the sun and ring gear rotate in the same direction and opposite to the carrier rotation, the compound planetary may be depicted with both the sun and the ring gear on the same side with respect to the carrier.

Referring now to FIG. 17, in certain embodiments, a high-ratio simple planetary traction drive transmission 2100 may be similar to the high-ratio traction drive transmissions depicted in FIGS. 1-3. The high-ratio simple planetary traction drive transmission 2100 includes a ring member 2101 (depicted on the lever diagram as "R1"), a carrier 2102 (depicted on the lever diagram as "C1"), and a sun member 2103 (depicted on the lever diagram as "S1"). The ring-to-sun (RTS) ratio of the high-ratio simple planetary traction drive transmission may be depicted as "e1" on the lever diagram.

Referring now to FIG. 18, in certain embodiments, a high-ratio compound planetary traction drive transmission 2105 may be similar to the high-ratio traction drive transmission depicted in FIG. 4. A compound lever may be represented similarly in a lever diagram, except that because the sun and ring gear rotate in the same direction and opposite to the carrier rotation, the compound planetary may be depicted with both the sun and the ring gear on the same side with respect to the carrier. It should be appreciated that compound planetaries are a general category of planetary transmissions having, but not limited to, multiple traction planets, stepped traction members, or other compound features. Although the ring-to-sun (RTS) ratio of the high-ratio compound planetary traction drive transmission may be still defined as "e1" on the lever diagram, typically the distance between the ring and the sun nodes may be depicted as "e1-1" on the lever diagram.

In certain embodiments, the high-ratio compound planetary traction drive transmission 2105 includes a ring member 2107 (depicted as "R1" on the lever diagram), a carrier member 106 (depicted as "C1" on the lever diagram), and a sun member 2108 (depicted as "S1" on the lever diagram).

Referring now to FIGS. 19-21, embodiments of high-ratio transmissions incorporating two high-ratio simple planetary traction drive transmissions will be described. In certain embodiments, a simple-simple traction drive transmission 2110A includes a first high-ratio simple planetary traction drive transmission having a first ring member 2111 ("R1"), a first carrier 2112 ("C1"), and a first sun member 2113 ("S1") operably coupled to a second high-ratio simple planetary traction drive transmission having a second ring member 2114 ("R2") coupled to the first carrier 2112, a second carrier 2115 ("C2") coupled to the first ring member 2111, and a second sun 2116 ("S2"). The lever diagram for the transmission 2110A may be reduced to the lever diagram 2110B depicted in FIG. 20. The coupling between the first ring member 2111 and the second carrier 2115 may be depicted as a first connection 2117 ("R1C2"). The coupling between the second ring member 2114 and the first carrier 2112 may be depicted as a second connection 2118 ("C1R2"). It should be appreciated that the lever diagram shown in FIG. 20 may be representative of one of many configurations formed between the two high-ratio simple planetary traction drive transmission, and that other configurations are formed by the connections as depicted in the Table 2120 of FIG. 21, where couplings for the first connection 2117 are listed in the first row, and couplings for the second connection 2118 are listed in the three rows below the first. For example, the first connection 2117 may be the first sun member 2113 coupled to the second sun member 2116 while the second connection 2118 may be the first carrier 2112 coupled to the second carrier 2115.

In certain embodiments, the second connection 2118 may be the first carrier 2112 coupled to the second ring member 2114.

In other embodiments, the second connection 2118 may be the first ring member 2111 coupled to the second carrier 2115.

In yet other embodiments, the second connection 2118 may be the first ring member 2111 coupled to the second ring member 2112. Because the order of connection may not be relevant to the functionality of the transmission, duplicate arrangements are identified in Table 2120 of FIG. 21 with shaded cells. It should be appreciated that one of the simple planetaries depicted in Table 2120 may be configured as a conventional geared simple planetary gear set.

Referring now to FIGS. 22-24, embodiments of high-ratio transmissions incorporating a high-ratio simple planetary traction drive transmission coupled to a high-ratio compound planetary traction drive transmission will be described.

In certain embodiments, a simple-compound traction drive transmission 2125A includes a first high-ratio simple planetary traction drive transmission having a first ring member 2126 ("R1"), a first carrier 2127 ("C1"), and a first sun member 2128 ("S1") operably coupled to a second high-ratio compound planetary traction drive transmission having a second ring member 2129 ("R2") coupled to the first ring member 2126, a second carrier 2130 ("C2") coupled to the first carrier 2127, and a second sun 2131 ("S2"). The lever diagram for the transmission 2125A may be reduced to the lever diagram 2125B depicted in FIG. 23. The coupling between the first ring member 2126 and the second ring member 2129 may be depicted as a first connection 2132 ("R1R2"). The coupling between the second carrier 2130 and the first carrier 2127 may be depicted as a second connection 2133 ("C1C2").

It should be appreciated that the lever diagram shown in FIG. 23 may be representative of one of many configurations formed between a high-ratio simple planetary traction drive transmission and a high-ratio compound planetary traction drive transmission, and that other configurations are formed by the connections as depicted in the Table 2135 of FIG. 24 where couplings for the first connection 2132 are listed in the first row, and couplings for the second connection 2133 are listed in the three rows below the first. For example, the first connection 2132 may be the first sun member 2128 coupled to the second sun member 2131 while the second connection 2133 may be the first carrier 2127 coupled to the second carrier 2130.

In certain embodiments, the second connection 2133 may be the first carrier 2127 coupled to the second ring member 2129.

In other embodiments, the second connection 2133 may be the first ring member 2126 coupled to the second carrier 2130.

In yet other embodiments, the second connection 2133 may be the first ring member 2126 coupled to the second ring member 2129. Because the order of connection may not be relevant to the functionality of the transmission, duplicate arrangements are identified in Table 2135 of FIG. 24 with shaded cells. It should be appreciated that the simple planetary depicted in Table 2135 may be configured as a conventional geared simple planetary gear set. Likewise, the compound planetary depicted in Table 2135 may be configured as a conventional geared compound planetary gear set.

Figures 27, 28:
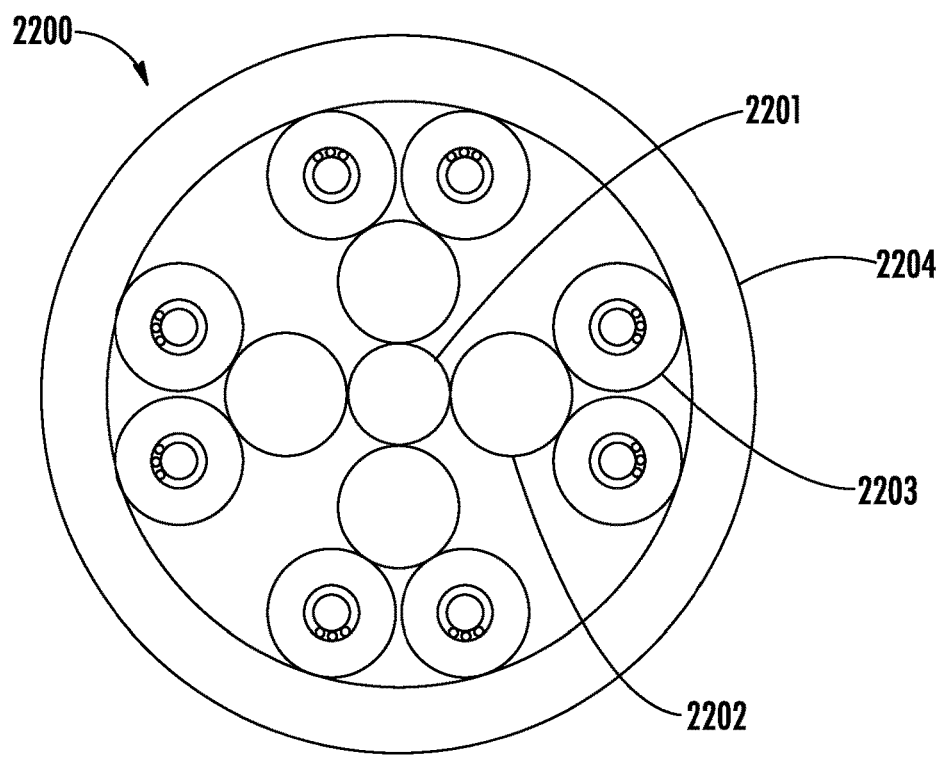
FIG. 27 is a table depicting component couplings of a high-ratio compound planetary traction drive transmission coupled to another high-ratio compound planetary transmission.
FIG. 28 is a cross-sectional view of an embodiments of a compound tapered planetary traction roller transmission type.

Referring now to FIGS. 25-27, embodiments of high-ratio transmissions incorporating two high-ratio compound planetary traction drive transmissions will be described. In certain embodiments, a compound-compound traction drive transmission 2140A includes a first high-ratio compound planetary traction drive transmission having a first ring member 2141 ("R1"), a first carrier 2142 ("C1"), and a first sun member 2143 ("S1") operably coupled to a second high-ratio compound planetary traction drive transmission having a second ring member 2144 ("R2") coupled to the first carrier 2142, a second carrier 2145 ("C2") coupled to the first ring member 2141, and a second sun 2146 ("S2"). The lever diagram for the transmission 2140A may be reduced to the lever diagram 2140B depicted in FIG. 26. The coupling between the first carrier 2142 and the second ring member 2144 may be depicted as a first connection 2147 ("C1R2"). The coupling between the second carrier 2145 and the first ring member 2141 may be depicted as a second connection 2148 ("R1C2").

It should be appreciated that the lever diagram shown in FIG. 26 may be representative of one of many configurations formed between a first high-ratio compound planetary traction drive transmission and a second high-ratio compound planetary traction drive transmission, and that other configurations are formed by the connections as depicted in the Table 2150 of FIG. 27 where couplings for the first connection 2147 are listed in the first row, and couplings for the second connection 2148 are listed in the three rows below the first. For example, the first connection 2147 may be the first sun member 2143 coupled to the second sun member 2146 while the second connection 2148 may be the first carrier 2142 coupled to the second carrier 2145.

In certain embodiments, the second connection 2148 may be the first carrier 2142 coupled to the second ring member 2144.

In other embodiments, the second connection 2148 may be the first ring member 2141 coupled to the second carrier 2145.

In yet other embodiments, the second connection 2148 may be the first ring member 2141 coupled to the second ring member 2144. Because the order of connection may not be relevant to the functionality of the transmission, duplicate arrangements are identified in Table 2150 of FIG. 27 with shaded cells. It should be appreciated that any one of the compound planetaries depicted in Table 2150 of FIG. 27 may be configured as a conventional geared compound planetary gear set.

Referring now to FIG. 28, in certain embodiments, a high-ratio traction drive 2200 may be configured as a dual pinion compound planetary that may be generally represented by the lever diagram of FIG. 18.

In certain embodiments, the high-ratio traction drive 2200 includes a sun member 2201 coupled to a first array of traction planets 2202. The first array of traction planets 2202 may be coupled to a second array of traction planets 2203. The second array of traction planets 2203 couple to a ring member 2204.

In certain embodiments, the high-ratio traction drive 2200 may be provided with a traction planet carrier (not shown) configured to support the first array of traction planets 2202 or the second array of traction planets 2203.

Advantages of the high-ratio traction drives 2100, 2105, 2110A, 2125A, and 2140A over the prior art and known conventional drives includes, but are not limited to the following:
higher input speed capability;
expanded ratio options;
use of axial thrust force as a loading mechanism in the traction planetaries; and
reduction and/or cancellation of thrust forces to affect bearing sizing, housing deflection, etc.

Figure 29:
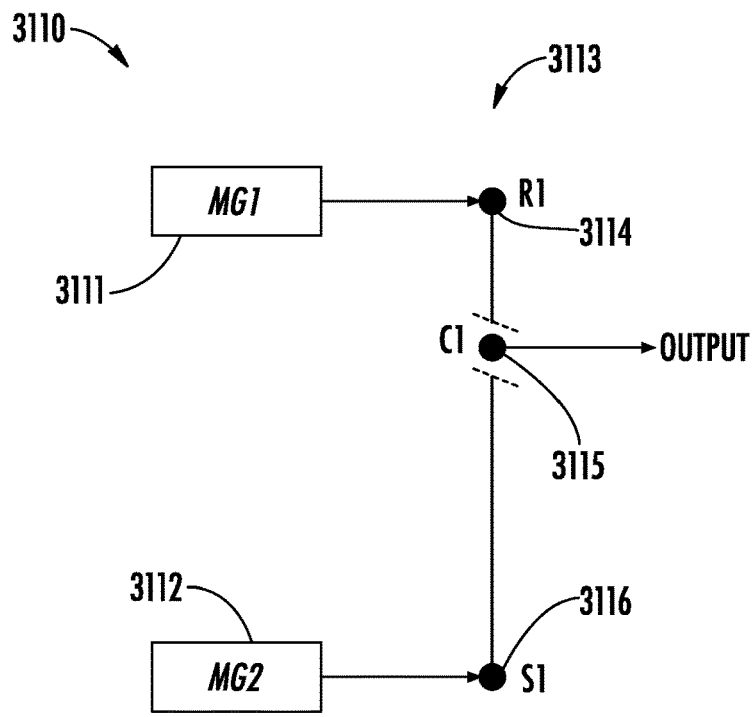
FIG. 29 is a lever diagram of an embodiment of a continuously variable electric drivetrain having two motors and a high-ratio traction drive transmission.

Referring now to FIG. 29, in certain embodiments, a continuously variable electric drivetrain (CVED) 3110 may be configured to be used in the electric axle powertrain 1100 shown in FIG. 11. In certain embodiments, the CVED 3110 may be provided with a first motor/generator 3111 and a second motor/generator 3112 operably coupled to a high-ratio traction drive transmission 3113. In one example, the first and second motor/generators 3111, 3112, are asymmetric motors in terms of speed and torque capability. The high-ratio traction drive transmission 3113 is configured to account for the asymmetry factor from the first and second motor/generators 3111, 3112.

In certain embodiments, the high-ratio traction drive transmission 3113 includes a ring member 3114 in contact with a number of traction rollers supported in a carrier 3115, each traction roller in contact with a sun member 3116. For purposes of description, a tapered traction drive, the dashed lines at the carrier node 3115 represents the axial displacement inherent to the loading mechanism of the device. In certain embodiments, the carrier 3115 may be configured to transfer rotational power out of the CVED 3110. In certain embodiments, the first motor/generator 3111 may be coupled to the ring member 3114. In certain embodiments, the second motor/generator 3112 may be coupled to the sun member 3116. It should be appreciated that the high-ratio traction drive transmission 3113 may be depicted as a lever diagram to simplify the kinematic relationship between components in the CVED 3110, and that the high-ratio traction drive transmission 3113 may be configured in a variety of physical forms as described previously. It should be noted that the dashed lines around the carrier 3115 represent the axial displacement inherent to the axial loading mechanism for devices of axis type.

Figure 30:
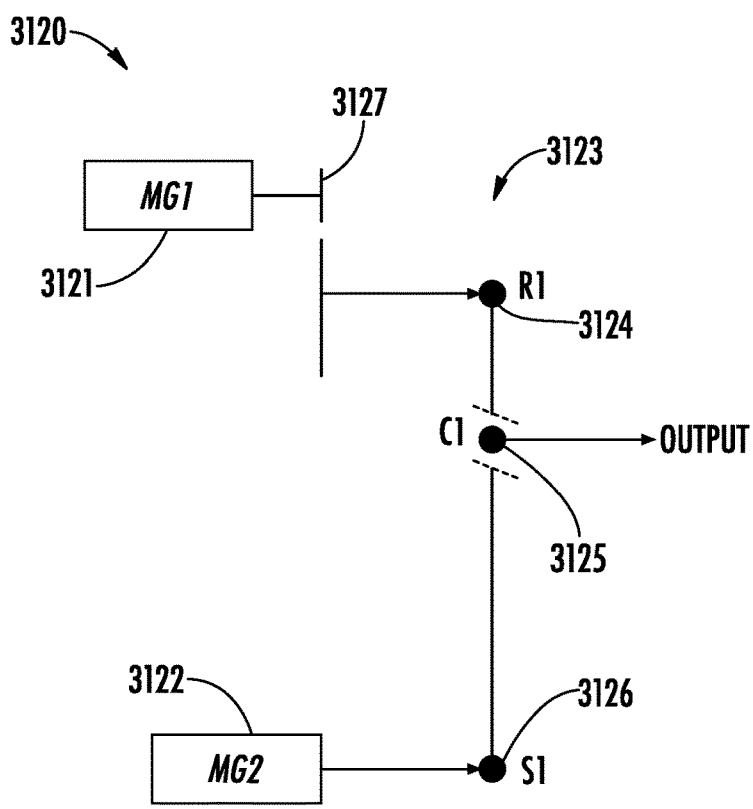
FIG. 30 is a lever diagram of another embodiment a continuously variable electric drivetrain having two motors and a high-ratio traction drive transmission.

Referring now to FIG. 30, in certain embodiments, a continuously variable electric drivetrain (CVED) 3120 may be configured to be used in the electric axle powertrain 1100 shown in FIG. 11. In certain embodiments, the CVED 3120 may be provided with a first motor/generator 3121 and a second motor/generator 3122 operably coupled to a high-ratio traction drive transmission 3123. The CVED 3120 is an extension of the concept shown in FIG. 29, utilizing transfer gears between the first and second motor/generators 3121, 3122 and the high-ratio traction drive transmission 3123 enables various combinations of either symmetric or asymmetric motors to be used to achieve desired results.

In certain embodiments, the high-ratio traction drive transmission 3123 includes a ring member 3124 in contact with a number of traction rollers supported in a carrier 3125, each traction roller in contact with a sun member 3126. In certain embodiments, the carrier 3125 may be configured to transfer rotational power out of the CVED 3120. In certain embodiments, the first motor/generator 3121 may be operably coupled to the ring member 3124 through a transfer gear 3127. The transfer gear 3127 may be configured to be a gear set having engaging teeth or a traction roller element. In certain embodiments, the second motor/generator 3122 may be coupled to the sun member 3126. It should be appreciated that the high-ratio traction drive transmission 3123 may be depicted as a lever diagram to simplify the kinematic relationship between components in the CVED 3120, and that the high-ratio traction drive transmission 3123 may be configured in a variety of physical forms as described previously. It should be noted that the dashed lines around the carrier 3125 represent the axial displacement inherent to the axial loading mechanism for devices of axis type.

Figure 31:
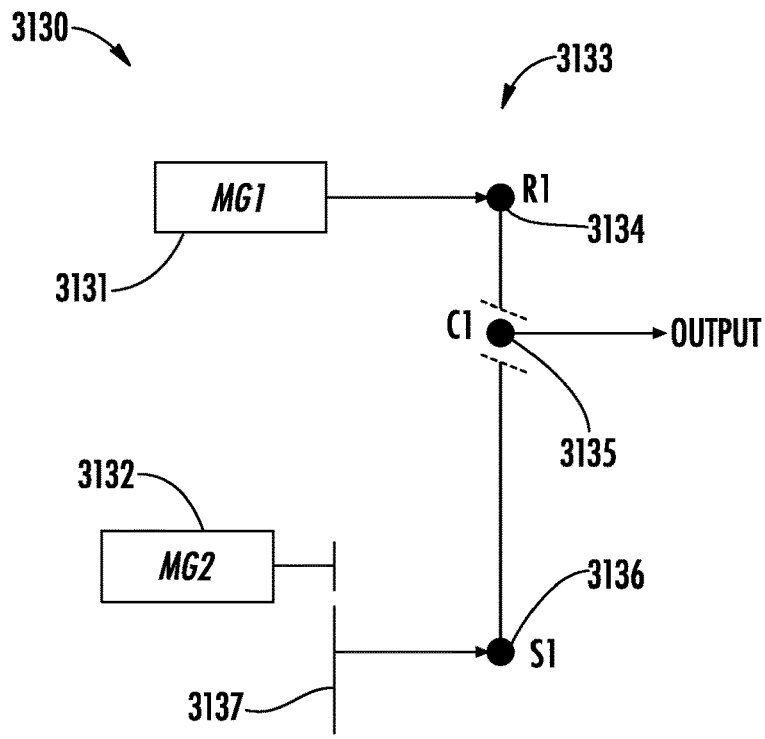
FIG. 31 is a lever diagram of another embodiment a continuously variable electric drivetrain having two motors and a high-ratio traction drive transmission.

Referring now to FIG. 31, in certain embodiments, a continuously variable electric drivetrain (CVED) 3130 may be configured to be used in the electric axle powertrain 1100 shown in FIG. 11. In certain embodiments, the CVED 3130 may be provided with a first motor/generator 3131 and a second motor/generator 3132 operably coupled to a high-ratio traction drive transmission 3133. The CVED 3130 is also an extension of the concept shown in FIG. 29, utilizing transfer gears between the first and second motor/generators 3131, 3132 and the high-ratio traction drive transmission 3133 enables various combinations of either symmetric or asymmetric motors to be used to achieve desired results.

In certain embodiments, the high-ratio traction drive transmission 3133 includes a ring member 3134 in contact with a number of traction rollers supported in a carrier 3135, each traction roller in contact with a sun member 3136. In certain embodiments, the carrier 3135 may be configured to transfer rotational power out of the CVED 3130. In certain embodiments, the first motor/generator 3131 may be coupled to the ring member 3134. In certain embodiments, the second motor/generator 3132 may be operably coupled to the sun member 3136 through a transfer gear 3137. The transfer gear 3137 may be configured to be a gear set having engaging teeth or a traction roller element. It should be appreciated that the high-ratio traction drive transmission 3133 may be depicted as a lever diagram to simplify the kinematic relationship between components in the CVED 3130, and that the high-ratio traction drive transmission 3133 may be configured in a variety of physical forms as described previously. It should be noted that the dashed lines around the carrier 3135 represent the axial displacement inherent to the axial loading mechanism for devices of axis type.

Figure 32:
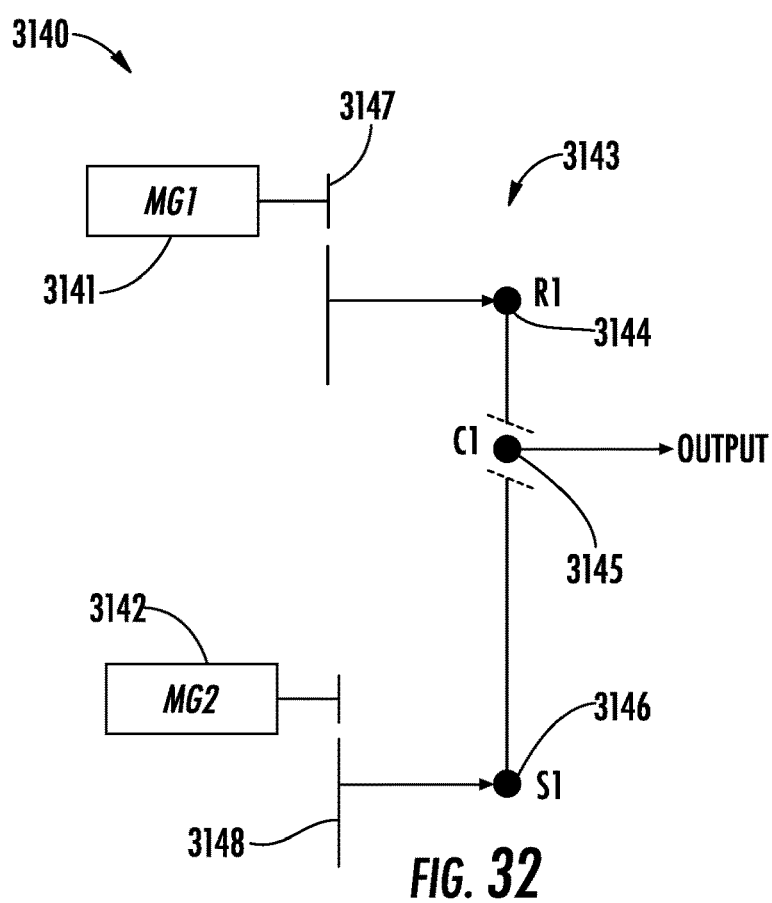
FIG. 32 is a lever diagram of yet another embodiment a continuously variable electric drivetrain having two motors and a high-ratio traction drive transmission.

Referring now to FIG. 32, in certain embodiments, a continuously variable electric drivetrain (CVED) 3140 may be configured to be used in the electric axle powertrain 1100 shown in FIG. 11. In certain embodiments, the CVED 3140 may be provided with a first motor/generator 3141 and a second motor/generator 3142 operably coupled to a high-ratio traction drive transmission 3143. The CVED 3130 is yet another extension of the concept shown in FIG. 29, utilizing transfer gears between the first and second motor/generators 3141, 3142 and the high-ratio traction drive transmission 3143 enables various combinations of either symmetric or asymmetric motors to be used to achieve desired results.

In certain embodiments, the high-ratio traction drive transmission 3143 includes a ring member 3144 in contact with a number of traction rollers supported in a carrier 3145, each traction roller in contact with a sun member 3146. In certain embodiments, the carrier 3145 may be configured to transfer rotational power out of the CVED 3140. In certain embodiments, the first motor/generator 3141 may be operably coupled to the ring member 3144 through a transfer gear 3147. The transfer gear 3147 may be configured to be a gear set having engaging teeth or a traction roller element. In certain embodiments, the second motor/generator 3142 may be operably coupled to the sun member 3146 through a transfer gear 3148. The transfer gear 3148 may be configured to be a gear set having engaging teeth or a traction roller element. It should be appreciated that the high-ratio traction drive transmission 3143 may be depicted as a lever diagram to simplify the kinematic relationship between components in the CVED 3140, and that the high-ratio traction drive transmission 3143 may be configured in a variety of physical forms as described previously. It should be noted that the dashed lines around the carrier 3145 represent the axial displacement inherent to the axial loading mechanism for devices of axis type.

Figure 33:
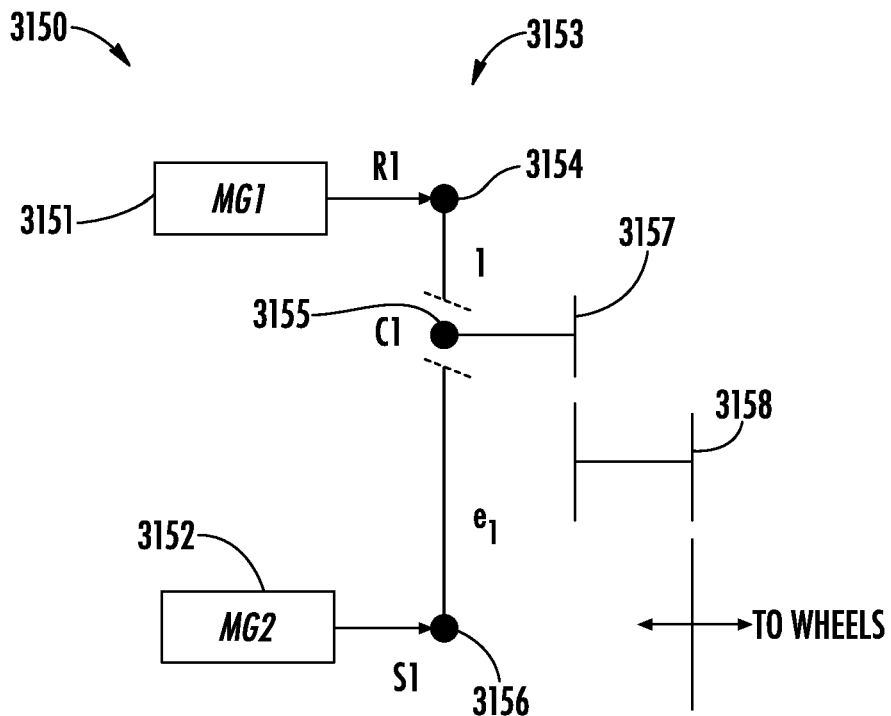
FIG. 33 is a lever diagram of yet another embodiment a continuously variable electric drivetrain having two motors and a high-ratio traction drive transmission.

Referring now to FIG. 33, in certain embodiments, a continuously variable electric drivetrain (CVED) 3150 may be configured to be used in the electric axle powertrain 1100 shown in FIG. 11. In certain embodiments, the CVED 3150 may be provided with a first motor/generator 3151 and a second motor/generator 3152 operably coupled to a high-ratio traction drive transmission 3153.

In certain embodiments, the high-ratio traction drive transmission 3153 includes a ring member 3154 in contact with a number of traction rollers supported in a carrier 3155, each traction roller in contact with a sun member 3156. In certain embodiments, the carrier 3155 may be configured to transfer rotational power out of the CVED 3150. In certain embodiments, the first motor/generator 3151 may be operably coupled to the ring member 3154. In certain embodiments, the second motor/generator 3152 may be operably coupled to the sun member 3156. It should be appreciated that the high-ratio traction drive transmission 3153 may be depicted as a lever diagram to simplify the kinematic relationship between components in the CVED 3150, and that the high-ratio traction drive transmission 3153 may be configured in a variety of physical forms as described previously. In certain embodiments, the CVED 3150 may be provided with multiple downstream gears that provide torque multiplication to the driven wheels. In certain embodiments, the CVED 3150 may be provided with a first transfer gear 3157 coupled to the carrier 3155. In certain embodiments, the first transfer gear 3157 couples to a second transfer gear 3158. The first transfer gear 3157 and the second transfer gear 3158 may be coaxial planetaries or may be transfer gear arrangements as depicted in FIG. 33. It should be noted that the dashed lines around the carrier 3155 represent the axial displacement inherent to the axial loading mechanism for devices of axis type.

It is understood that each of the CVED 3110, the CVED 3120, the CVED 3130, the CVED 3140, and the CVED 3150 may be configured to function as a variator. A control system (e.g. a motor control system of FIGS. 37-38 described hereinafter) may utilize one of the CVED 3110, the CVED 3120, the CVED 3130, the CVED 3140, and the CVED 3150 as a variator to optimize either performance and/or efficiency by maintaining at least one of the first motor/generator 3111, 3121, 3131, 3141, 3151 and the second motor/generator 3112, 3122, 3132, 3142, 3152 in a constant torque region or on a peak efficiency island. Using one of the high-ratio traction drive transmission 3113, 3123, 3133, 3143, 3153 enables high-speed motors in certain configurations, which are otherwise not feasible with a conventional geared planetary. Furthermore, it should be appreciated that each of the CVED 3110, the CVED 3120, the CVED 3130, the CVED 3140, and the CVED 3150 may be disposed in at least one of a front and rear position in a vehicle and may operate as either a primary drive in a four-wheel-drive or a rear-wheel-drive architecture, or as a secondary drive in either the front or rear position in the vehicle for an all-wheel-drive architecture. Additionally, each of the CVED 3110, the CVED 3120, the CVED 3130, the CVED 3140, and the CVED 3150 may be contained at a wheel hub location, if desired.

Figure 34:
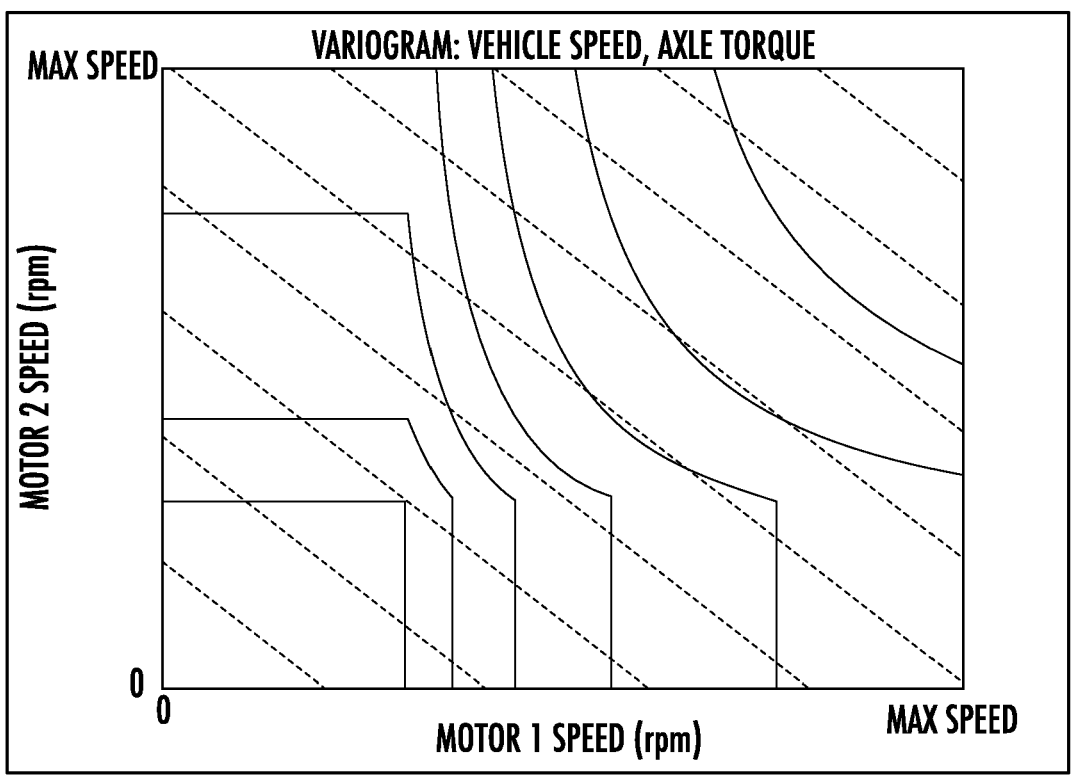
FIG. 34 is a variogram showing the range of possible vehicle speeds and axle torques as a function of motor speeds for a representative configuration of the presently disclosed subject matter of FIGS. 29 through 33.

Turning now to FIG. 34, an illustrative example of a variogram is shown depicting the range of possible vehicle speeds and axle torques as a function of the first motor speed (x-axis) and the second motor speed (y-axis). FIG. 34 shows an operation of two motor/generators (e.g. the motor/generators shown and described in FIGS. 29-33) with a summing planetary which may function as a variator. As such, an electric motor speed is not constrained by vehicle speed exclusively, which is advantageous over a conventional single motor or dual motor arrangement. During operation of the CVED 3110, the CVED 3120, the CVED 3130, the CVED 3140, or the CVED 3150 the first motor/generator may be connected to the ring member and may be a low-speed, high-torque device used in torque control mode. The second motor/generator may be a high-speed, low-torque device connected to the sun member and used in speed control mode. Output of the CVED 3110, the CVED 3120, the CVED 3130, the CVED 3140, or the CVED 3150 may be taken from the carrier 3115, 3125, 3135, 3145, 3155. The high-ratio traction drive transmission functions as a summing planetary and each motor/generator may be controlled to perform in a peak efficiency region as vehicle speed and power requirements change throughout operation.

It should be appreciated that the choice of the ring to sun ratio "e1" for the summing planetary may be selected to account for the asymmetric nature of the motor/generators (either in the speed, torque, or power domain). Additionally, the transfer gear arrangements 3127, 3132, 3147, or 3148 may be configured to alter the torque and speed profiles of the electric machines such that symmetric motors may be used, or such that configurable combinations of asymmetric machines are feasible.

Referring now to FIGS. 35-38, in certain embodiments, during operation of the CVED 3110, the first motor/generator 3111 may be connected to the ring member 3114 and may be a low-speed, high-torque device used in torque control mode. The second motor/generator 3112 may be a high-speed, low-torque device connected to the sun member 3116 and used in speed control mode. Output of the CVED 3110 may be taken from the carrier 3115. The high-ratio traction drive transmission functions as a summing planetary and each motor/generator may be controlled to perform in a peak efficiency region as vehicle speed and power requirements change throughout operation.

Figure 35:
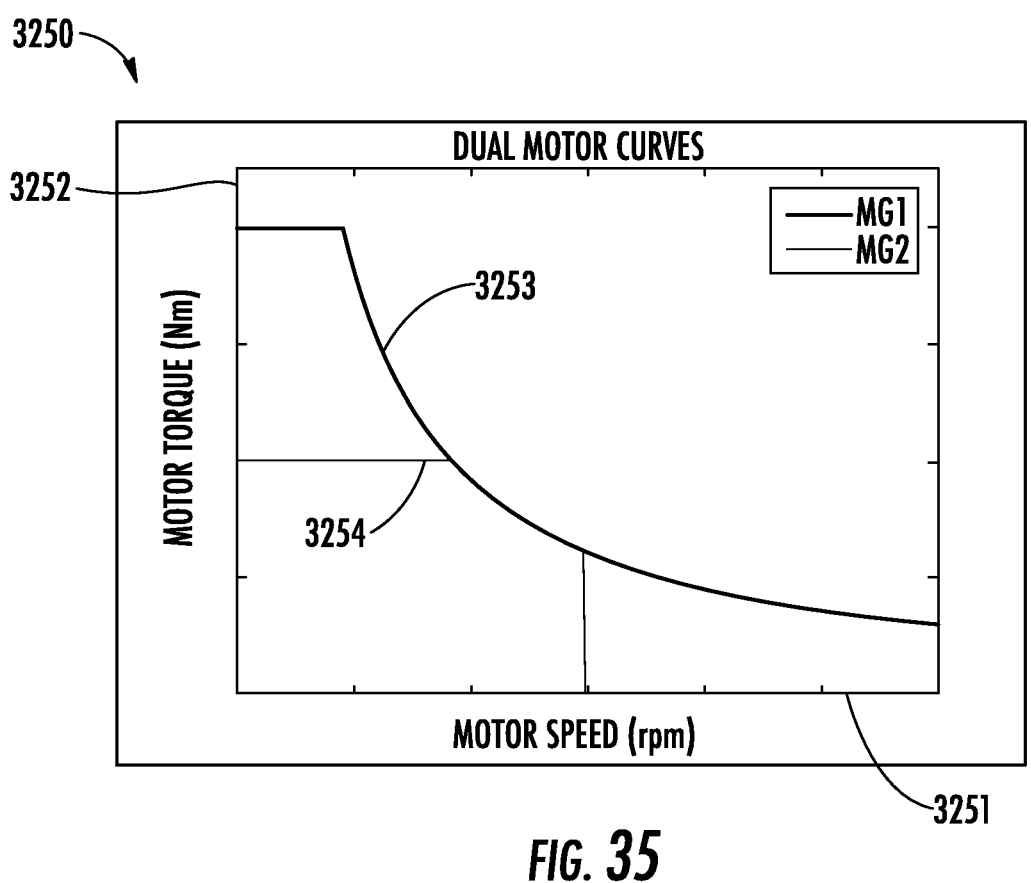
FIG. 35 is a chart depicting electric motor torque in relation to electric motor speed for two electric motors.
Figure 36A:
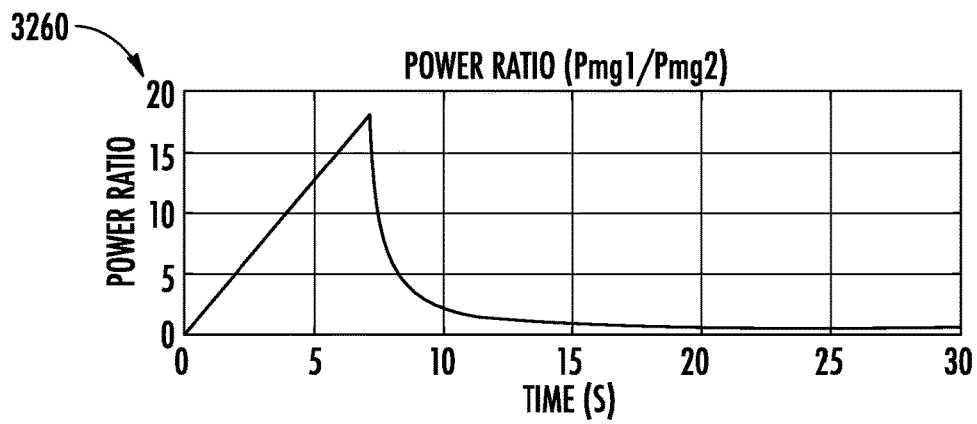
FIGS. 36A-36D are charts depicting a power ratio and a torque ratio of two electric motors versus time.
Figure 36B:
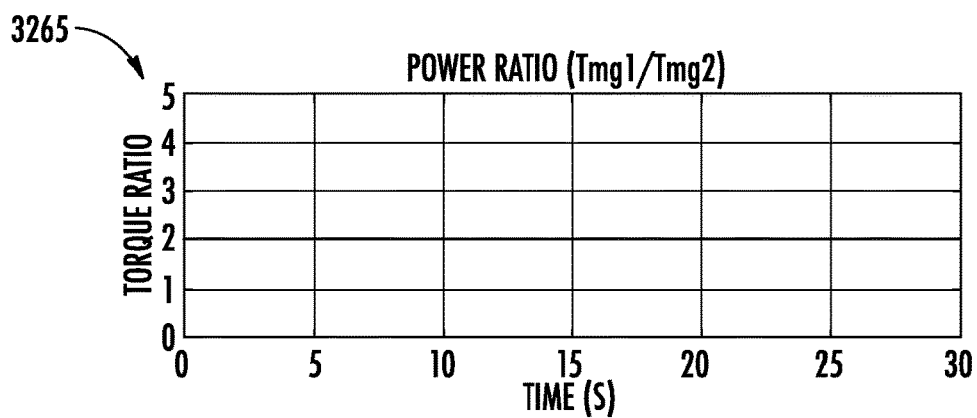
Figure 36C:
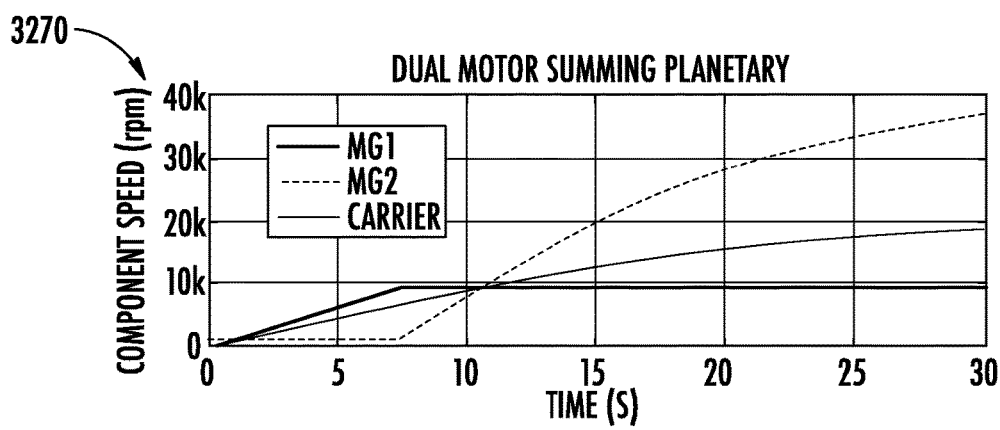
Figure 36D:
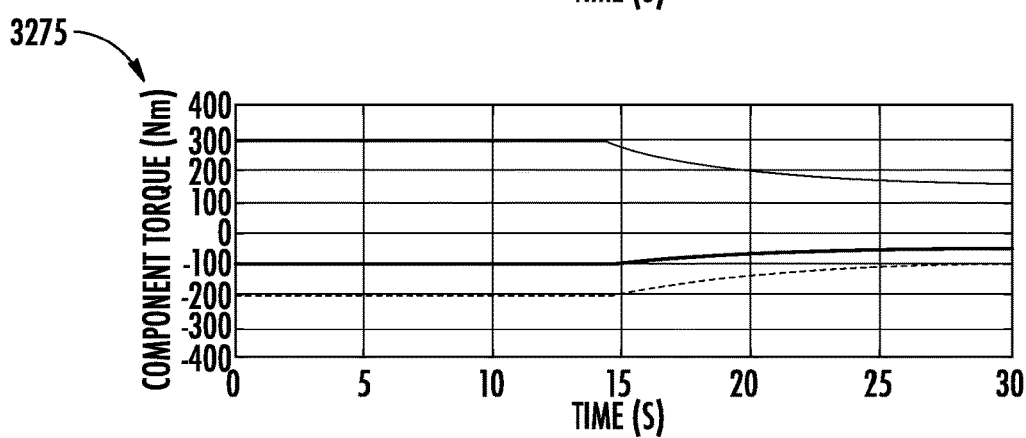

Referring now to FIG. 35, in certain embodiments, operating characteristics of the first electric motor/generator 3111 may be depicted by a line 3253 on a chart 3250. The chart 3250 has an x-axis be representing motor speed (rpm) 3251 and a y-axis be representing motor torque (Nm) 3252. Operating characteristics of the second electric motor/generator 3112 may be depicted by a line 3254 on the chart 3250.

In certain embodiments, a relationship between the first motor/generator 3111 and the second motor/generator 3112 for torque and for speed are generally defined by the following equations:

$$T_{MG1} = T_{MG2} * e_1$$

$$T_{carrier} = T_{MG1}((e_1 + 1/e_1) = T_{MG2}(e_1 + 1)$$

$$T_{carrier} = T_{MG1} + T_{MG2}$$

$$\omega_{MG2} = \omega_{carrier}(e_1 + 1) - \omega_{MG1} * e_1$$

Where $T_{MG1}$ may be the torque of the first motor/generator, $T_{MG2}$ may be the torque of the second motor/generator, and $e_1$ may be the ring-to-sun (RTS) ratio of the high-ratio traction drive transmission 3113. Where $\omega_{MG1}$ may be the speed of the first motor/generator 3111, $\omega_{MG2}$ may be the speed of the second motor/generator 3112, and co carrier may be the speed of the carrier 3115. From these relationships, it may be observed that as $e_1$ increases, the torque multiplication of the second motor/generator 3112 gets larger, and that the torque multiplication of the first motor/generator 3111 gets smaller, such that the output torque of the summing planetary 3113 at carrier 3115 may be always equal to the sum of the motor/generator torques and may be independent of the choice of the ring to sun ratio $e_1$. It should be appreciated that the mechanical point for an electric hybrid powertrain may be characterized by a non-zero vehicle speed, or non-zero transmission output speed, and a near zero electric machine speed. A pseudo mechanical point exists where each motor, for example the first motor/generator 3111 or the second motor/generator 3112, may be at 0 speed. Pseudo-mechanical point refers to the concept that although there may be no mechanical power transmission through the planetary from an ICE as in a hybrid vehicle, the equivalent concept of reducing electrical power consumption by operating one machine near zero speed still applies. A two-degree of freedom system, such as the CVED 3110, allows the mechanical point to be shifted with carrier speed (proportional to vehicle speed) and shifted based on speed command of MG2. A first pseudo mechanical point ($psm_1$) may be feasible at lower vehicle speeds and a second pseudo mechanical point ($psm_2$) may be appropriate for higher vehicle speeds. The following equations depict the relationship, wherein $\omega_{out}$ may be the speed of the output:

$$psm_1 @ \omega_{out} = \omega_{MG2}/(e_1 + 1)$$

$$psm_2 @ \omega_{out} = \omega_{MG1} * e_1/(e_1 + 1)$$

Referring now to FIGS. 36A-36D, during operation of a vehicle equipped with the CVED 3110, the power ratio between the first motor/generator 3111 and the second motor/generator 3112 may be depicted in the chart 3260 versus time. The power ratio between motor/generators may be variable and may be a resultant of the control method and vehicle speed/load profiles. Once both motor/generators are above base speed (defined as constant power region) then the power ratio may be thus constant. The torque ratio between the first motor/generator 3111 and the second motor/generator 3112 may be depicted on the chart 3265 versus time. The torque ratio may be constant and equal to the ring to sun ratio "e1" of the summing planetary. A chart 3270 depicts the component speeds for the carrier 3115 and the first motor/generator 3111 and the second motor/generator 3112 versus time. A chart 3275 depicts the component torques for the carrier 3115 and the first motor/generator 3111 and the second motor/generator 3112 versus time. It should be understood that the legend shown in the chart 3270 is also applicable to the chart 3275. For an acceleration of a vehicle from a stop to a cruise speed, the carrier output torque curve may be essentially flat across the majority of the usable vehicle speed range. For reference, if the first motor/generator 3111 torque controlled motor was connected to equivalent gearing in a single motor configuration with the inherent constraints of vehicle speed, the motor base speed would be exceeded, and torque production would drop at a significantly lower vehicle speed.

Figure 37:
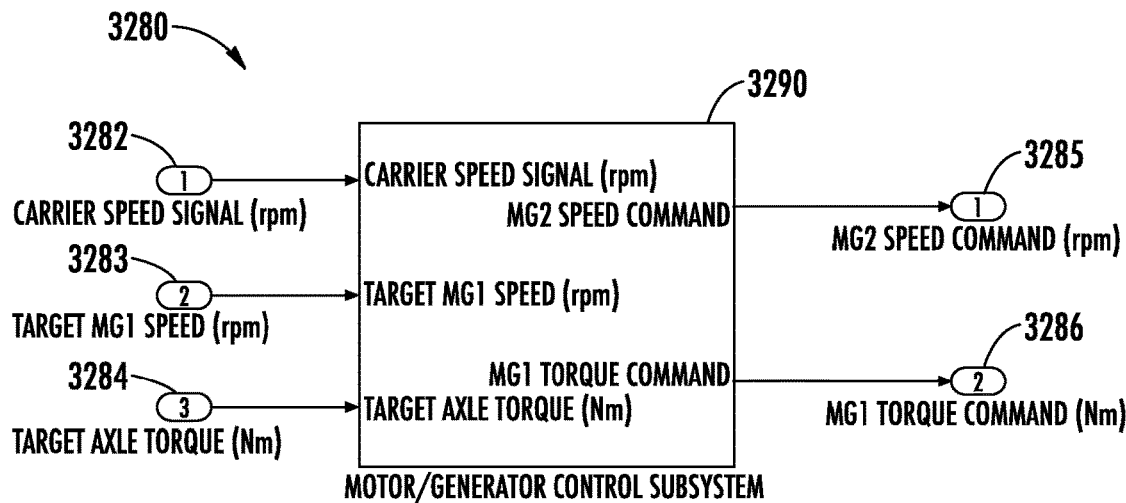
FIG. 37 is a block diagram of an electric motor controller that may be implemented for the electric axle of FIGS. 29 through 33.
Figure 38:
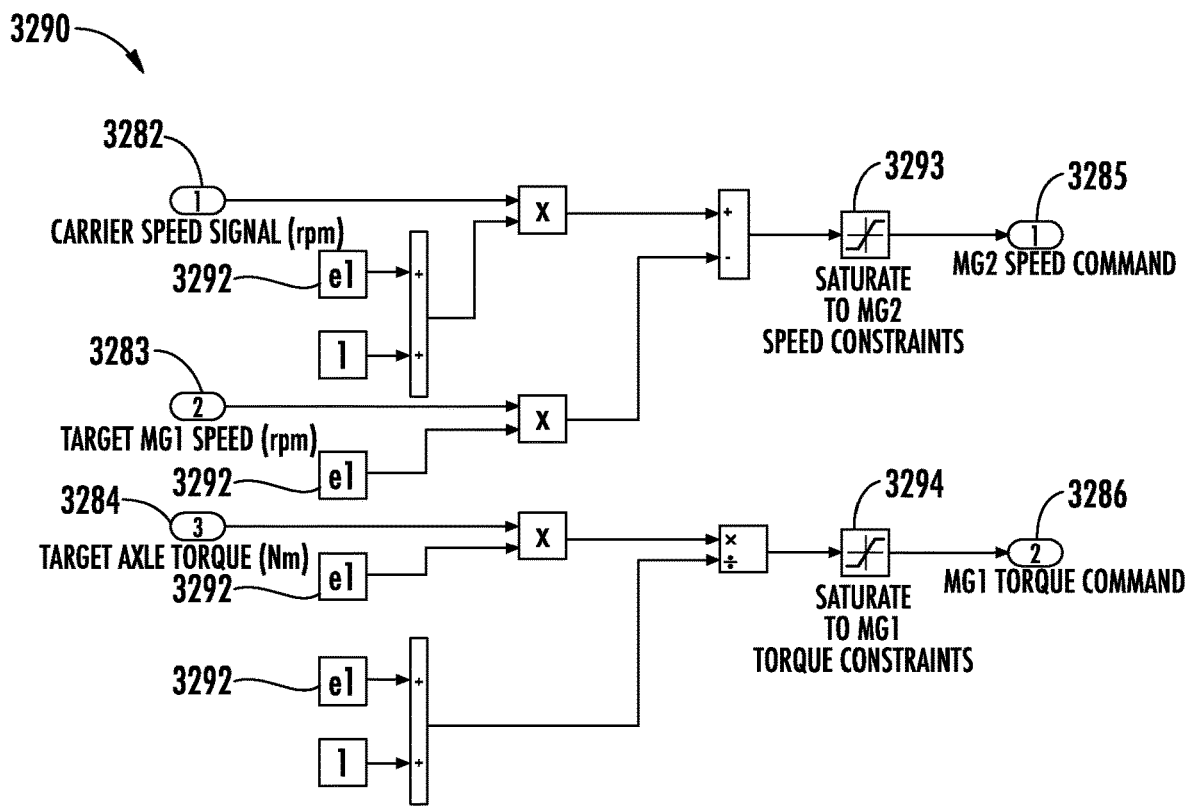
FIG. 38 may be a block diagram of the electric motor controller of FIG. 37.

Turning now to FIGS. 37-38, a function of the motor control system may be to fix the operating point of the first motor/generator 3111 in both the speed and torque domain by altering the speed setpoint of the second motor/generator 3112. The variogram shown in FIG. 34 illustrates the complete operating range of a two DOF system within the motor speed and torque constraints.

Turning now to FIG. 37, in certain embodiments, an electric motor controller 3280 may be implemented for control of the CVED 3110.

In certain embodiments, the electric motor controller 3280 has a number of software modules configured to control operation of the first motor/generator 3111 and the second motor/generator 3112. For clarity and conciseness, only relevant aspects of the electric motor controller 3280 are described herein.

In certain embodiments, the electric motor controller 3280 includes a motor/generator speed and torque control module 3290 configured to receive a carrier speed signal 3282 indicative of the speed of the carrier 3115.

In certain embodiments, the motor/generator speed and torque control module 3290 receives a target first motor/generator speed signal 3283 indicative of the target speed of the first motor/generator 3112.

In certain embodiments, the motor/generator speed and torque control module 3290 receives a target axle torque signal 3284. Road load and driver demand are accounted for in the target axle torque signal 3284, and thereby factor into the torque command for the first motor/generator 3111.

In certain embodiments, an optimization routine sets the target first motor/generator speed signal 3283 based on efficiency of both the first motor/generator 3111 and the second motor/generator 3112, among many other factors such as vehicle speed, battery state of charge, an accelerator pedal position, and road load. Since the operation point of the first motor/generator 3111 are set in both speed and torque domain, the second motor/generator speed command 3285 may be solved based on the lever equation as the carrier 3115 speed changes with vehicle speed.

In certain embodiments, the motor/generator speed and torque control module 3290 returns a first motor/generator torque command 3286.

The motor/generator speed and torque control module 3290 determines a speed command signal 3285 for the second motor/generator 3112.

Referring now to FIG. 38, in certain embodiments, the motor/generator speed and torque control module 3290 receives the carrier speed signal 3282 and multiplies by the RTS ratio 3292 added to unity.

In certain embodiments, the target first motor/generator speed signal 3283 may be multiplied by the RTS ratio 3292 forming a product that may be subtracted from the product of the carrier speed signal 3282 and the RTS ratio 3292 added to unity.

In certain embodiments, the motor/generator speed and torque control module 3290 applies limits to the speed of the second motor/generator 3112, for example, at the block 3293 and sends the speed command signal 3285 for the second motor/generator 3112.

In certain embodiments, the motor/generator speed and torque control module 3290 receives target axle torque signal 3284 and multiplies by the RTS ratio 3292 and passes the product to be divided by the RTS ratio 3292 added to unity.

In certain embodiments, the motor/generator speed and torque control module 3290 applies limits to the torque of the first motor/generator 3111, for example, at the block 3294 and sends the torque command signal 3286 for the first motor/generator 3111.

In certain embodiments, the speed constraints for the second motor/generator 3112 are applied around zero speed, otherwise in the low vehicle speed case with a high target first motor/generator speed, the second motor/generator speed command signal 3285 will be negative.

In certain embodiments, for example electric drivetrain implementing a powered carrier, the second motor/generator speed command signal 3285 may be negative, and the second motor/generator 3112 could absorb power off an engine while generating. It should be noted that in generator mode with positive speed for the second motor/generator 3112, and during regenerative braking, the sign of torque changes (positive speed, negative torque).

Figures 39, 40:
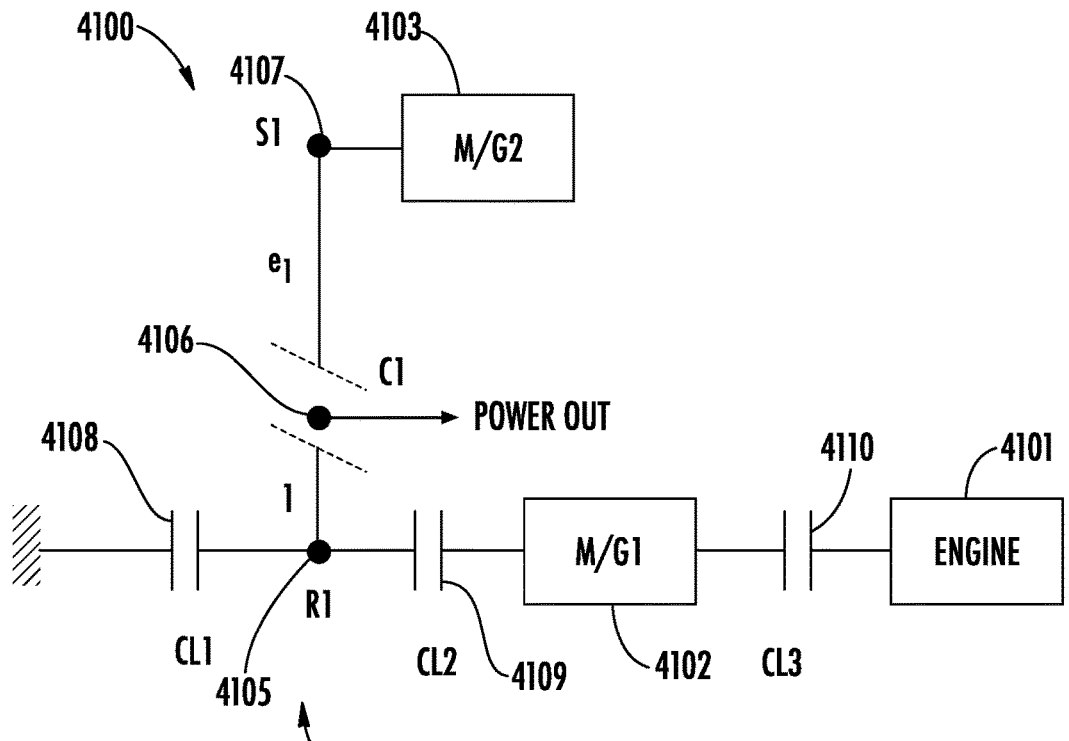
FIG. 39 is a schematic diagram of an electric hybrid powertrain having a traction drive transmission, two motor/generators, and an engine.
FIG. 40 is a table listing operating modes of the electric hybrid powertrain of FIG. 39.

Referring to FIG. 39, in certain embodiments, an electric hybrid powertrain 4100 includes an engine 4101, or other source of rotational power, a first electric/motor generator 4102 and a second electric/motor generator 4103 operably coupled with a traction drive transmission 4104.

In certain embodiments, the traction drive transmission 4104 includes a ring member 4105, a traction roller carrier 4106, and a sun member 4107. In certain embodiments, the electric hybrid powertrain 4100 includes a first clutch 4108 configured to selectively couple the ring member 4105 and a grounded member of the powertrain 4100, such as a non-rotatable housing (not shown). In certain embodiments, the electric hybrid powertrain 4100 includes a second clutch 4109 configured to selectively couple the ring member 4105 and the first motor generator 4102. In certain embodiments, the electric hybrid powertrain 4100 includes a third clutch 4110 configured to selectively couple the first motor/generator 4102 and the engine 4101. In certain embodiments, the second motor/generator 103 may be coupled to the sun member 4107. In certain embodiments, the traction roller carrier 4106 may be configured to transmit rotational power in or out of the electric hybrid powertrain 4100. It should be noted that the dashed lines around the carrier 4106 represent the axial displacement inherent to the axial loading mechanism for devices of axis type.

Referring now to FIG. 40, during operation of the electric hybrid powertrain 4100, multiple operating modes are achieved through engagement and disengagement of the clutches. For example, a first electric mode of operation corresponds to a condition when the engine 4101 may be off, the first clutch 4108 may be engaged to thereby couple the ring member 4105 to ground, while the second clutch 4109 and the third clutch 4110 are disengaged. In certain embodiments, a second electric mode of operation corresponds to a condition when the engine 4101 may be off, the second clutch 4109 may be engaged to thereby couple the ring member 4105 to the first motor/generator 4102, while the first clutch 4108 and the third clutch 4110 are disengaged. In certain embodiments, the electric hybrid powertrain 4100 operates in a series hybrid mode corresponding to the engine 4101 running, the first clutch 4108 engaged, and the third clutch 4110 engaged, while the second clutch 4109 may be disengaged. In certain embodiments, the electric hybrid powertrain 4100 operates in an output split operating mode corresponding to the engine 4101 running, the second clutch 4109 engaged, the third clutch 4110 engaged, while the first clutch 4108 may be disengaged.

Figure 41:
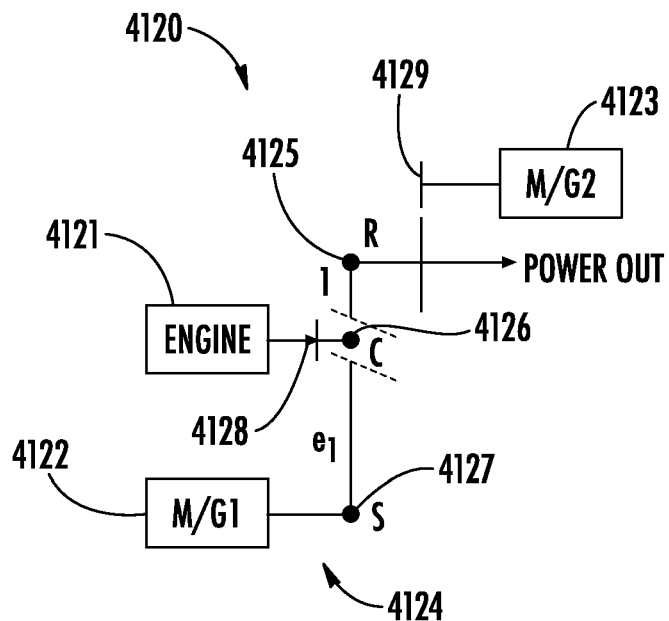
FIG. 41 is a schematic diagram of an electric hybrid powertrain having a traction drive transmission, two motor/generators, and an engine.

Referring now to FIG. 41, in certain embodiments, an electric hybrid powertrain 4120 includes an engine 4121, or other source of rotational power, a first electric/motor generator 4122 and a second electric/motor generator 4123 operably coupled with a traction drive transmission 4124. In certain embodiments, the traction drive transmission 4124 includes a ring member 4125 operably coupled to the second motor/generator 4123, a rotatable traction roller carrier 4126 coupled to the engine 4121 through a one-way clutch 4128, and a sun member 4127 coupled to the first motor/generator 4122. In certain embodiments, the electric hybrid powertrain 4120 may be provided with a transfer gear 4129 coupled to the second motor/generator 4123 and the ring member 4125. In certain embodiments, the carrier 4126 may be configured to transmit rotational power in and out of the electric hybrid powertrain 4120. It should be noted that the dashed lines around the carrier 4126 represent the axial displacement inherent to the axial loading mechanism for devices of axis type.

Figure 42:
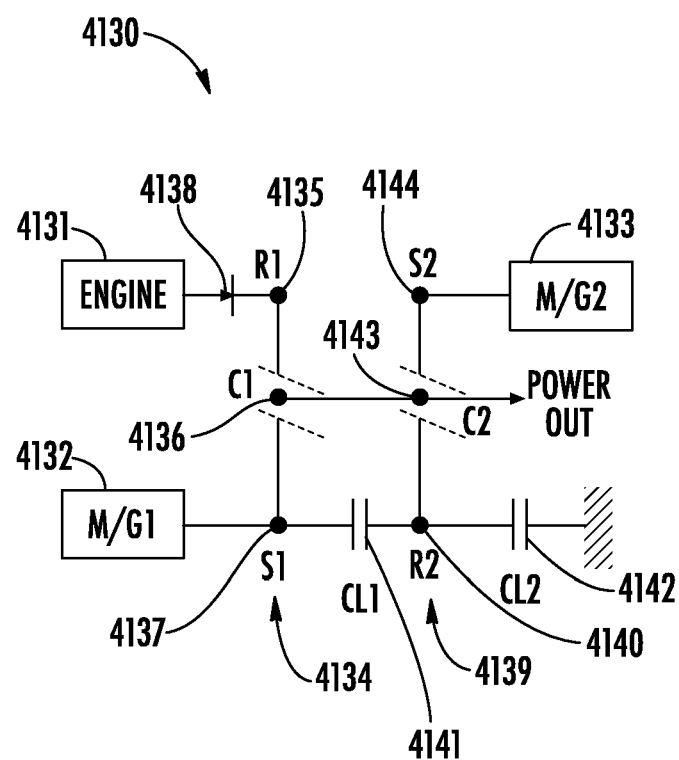
FIG. 42 is a schematic diagram of an electric hybrid powertrain having two traction drive transmissions, two motor/generators, and an engine.

Referring now to FIG. 42, in certain embodiments, an electric hybrid powertrain 4130 includes an engine 4131, or other source of rotational power, a first electric/motor generator 4132 and a second electric/motor generator 4133 operably coupled with a first traction drive transmission 4134. In certain embodiments, the first traction drive transmission 4134 includes a first ring member 4135 coupled to the engine 4131 through a one-way clutch 4138, a first rotatable traction roller carrier 4136, and a first sun member 4137 coupled to the first motor/generator 4132. In certain embodiments, the electric hybrid powertrain 4130 includes a second traction drive transmission 4139 having a second ring member 4140, a second rotatable traction roller carrier 4143, and a second sun member 4144. In certain embodiments, the second ring member 4140 may be selectively coupled to the first sun member 4137 through a first clutch 4141. In certain embodiments, the second ring member 4140 may be selectively coupled to ground through a second clutch 4142. In certain embodiments, the second sun member 4144 may be coupled to the second motor/generator 4133. In certain embodiments, the second rotatable traction roller carrier 4143 may be configured to transmit rotational power in and out of the electric hybrid powertrain 130. It should be noted that the dashed lines around the carrier 4136, 4143 represent the axial displacement inherent to the axial loading mechanism for devices of axis type.

Figure 43:
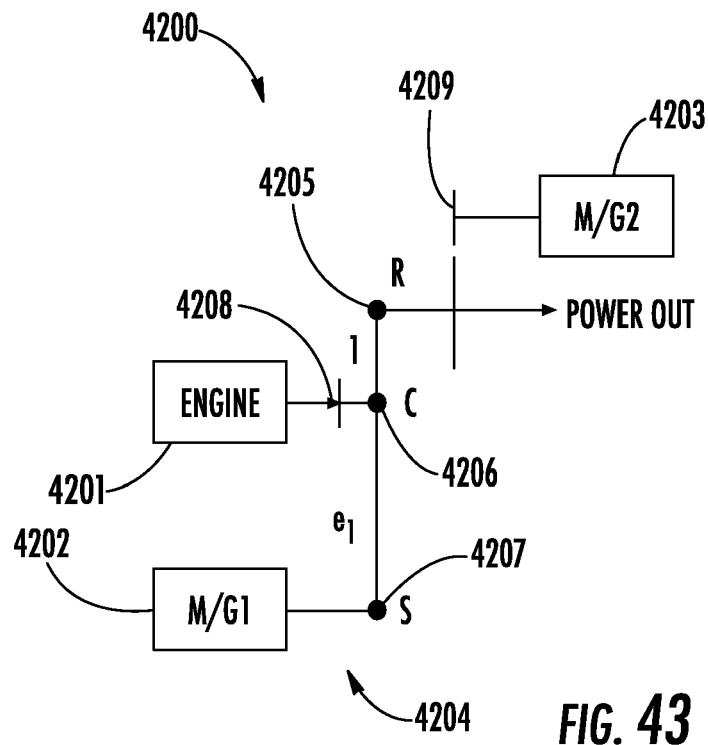
FIG. 43 is a schematic diagram of an electric hybrid powertrain having an engine and two electric motor/generators operably coupled through a planetary gear set.

Referring to FIG. 43, in certain embodiments, an electric hybrid powertrain 4200 includes an engine 4201, a first motor/generator 4202, and a second motor/generator 4203 operably coupled by a planetary gear set 4204. In certain embodiments, the planetary gear set 4204 includes a ring gear 4205 operably coupled to the second motor/generator 4203, a planet carrier 4206 operably coupled to the engine 4201, and a sun gear 4207 operably coupled to the first motor/generator 4202. In certain embodiments, a one-way clutch 4208 may be provided to couple the engine 4201 to the planet carrier 4206. In certain embodiments, a transfer gear set 4209 may be provided to couple the second motor/generator 4203 to the ring gear 4205. It should be appreciated that the planetary gear set 4204 and the transfer gear set 4209 implement gears having meshing teeth. As described herein, the planetary gear set 4204 and the transfer gear set 4209 may be configured to be traction drive transmissions.

Figure 44:
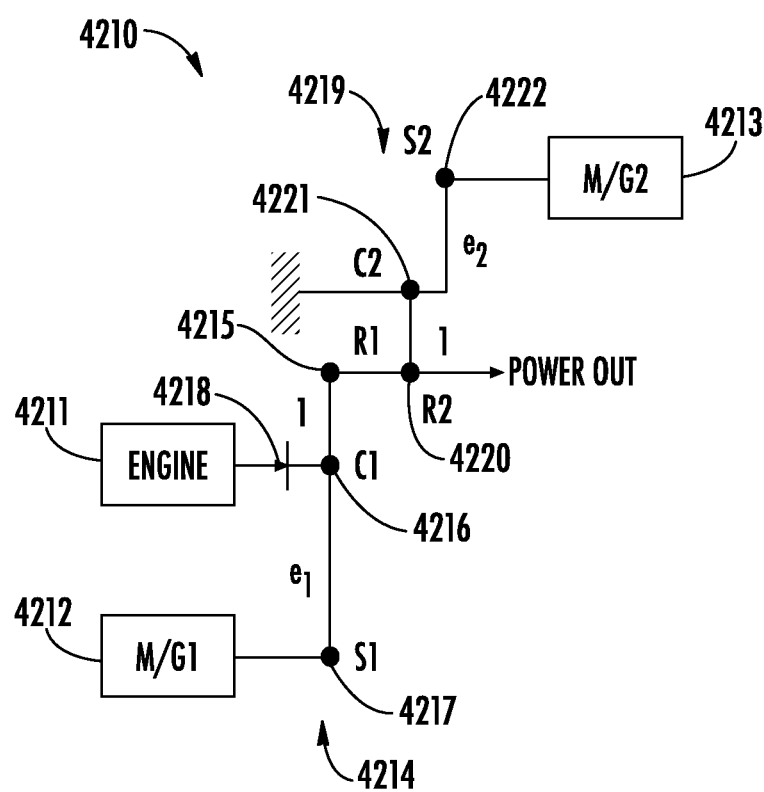
FIG. 44 is a schematic diagram of an electric hybrid powertrain having an engine and two electric motor/generators operably coupled through a planetary gear set and an offset traction roller transmission.

Referring to FIG. 44, in certain embodiments, an electric hybrid powertrain 4210 includes an engine 4211, a first motor/generator 4212, and a second motor/generator 4213 operably coupled by a planetary gear set 4214. In certain embodiments, the planetary gear set 4214 includes a ring gear 4215 operably coupled to the second motor/generator 4213, a planet carrier 4216 operably coupled to the engine 4211, and a sun gear 4217 operably coupled to the first motor/generator 4212. In certain embodiments, a one-way clutch 4218 may be provided to couple the engine 4211 to the planet carrier 4216. In certain embodiments, a transfer gear set 4219 may be provided to couple the second motor/generator 4213 to the ring gear 4215. In certain embodiments, the transfer gear set 4219 may be configured as an offset type traction drive transmission such as the offset type traction drive transmission shown in FIGS. 2 and 3, for example. The transfer gear set 4219 may be provided with a ring member 4220 operably coupled to the ring gear 4215. In certain embodiments, the transfer gear set 4219 may be provided with a non-rotatable traction planet carrier 4221. The transfer gear set 4219 includes a sun member 4222 coupled to the second motor/generator 4213. It should be noted that the traction planet carrier 4221 may be depicted offset from the sun member 4222 to represent the radial displacement of the centerlines of the sun member 4222 and the ring member 4220 with respect to each other.

Figure 45:
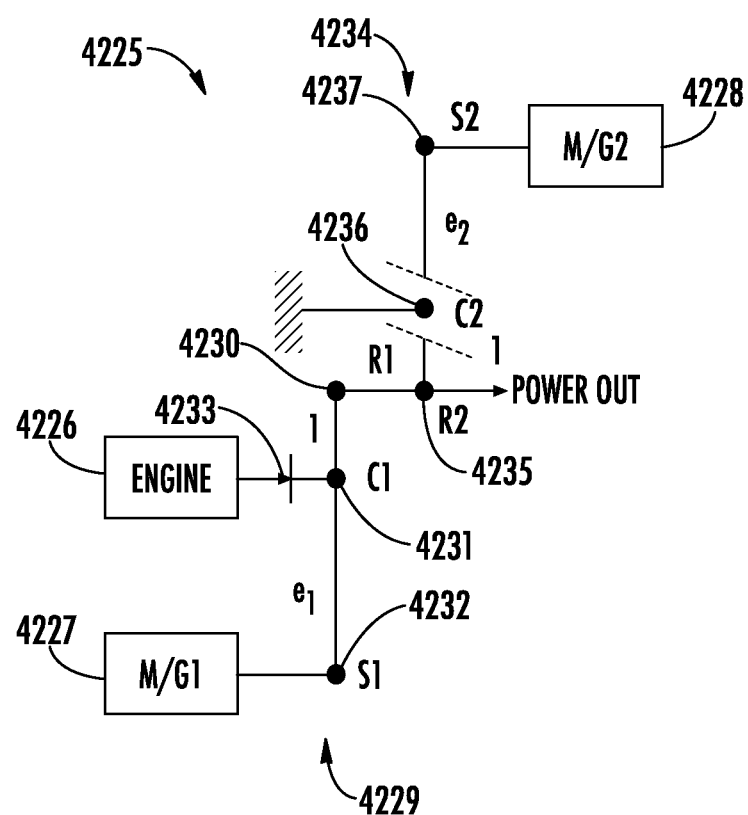
FIG. 45 is a schematic diagram of an electric hybrid powertrain having an engine, two electric motor/generators operably coupled through a planetary gear set and a tapered planetary traction roller transmission.

Referring to FIG. 45, in certain embodiments, an electric hybrid powertrain 4225 includes an engine 4226, a first motor/generator 4227, and a second motor/generator 4228 operably coupled by a planetary gear set 4229. In certain embodiments, the planetary gear set 4229 includes a ring gear 4230 operably coupled to the second motor/generator 4228, a planet carrier 4231 operably coupled to the engine 4226, and a sun gear 4232 operably coupled to the first motor/generator 4227. In certain embodiments, a one-way clutch 4233 may be provided to couple the engine 4226 to the planet carrier 4231. In certain embodiments, a transfer gear set 4234 may be provided to couple the second motor/generator 4228 to the ring gear 4230. In certain embodiments, the transfer gear set 4234 may be configured as a high-ratio traction drive transmission such as the high-ratio traction drive transmission shown in FIGS. 1 and 4, for example. The transfer gear set 4234 may be provided with a ring member 4235 operably coupled to the ring gear 4230. In certain embodiments, the transfer gear set 4234 may be provided with a non-rotatable traction planet carrier 4236. The transfer gear set 4234 includes a sun member 4237 coupled to the second motor/generator 4228. It should be noted that the dashed lines around the traction planet carrier 4236 represent the axial displacement inherent to the axial loading mechanism for devices of axis type.

Figure 46:
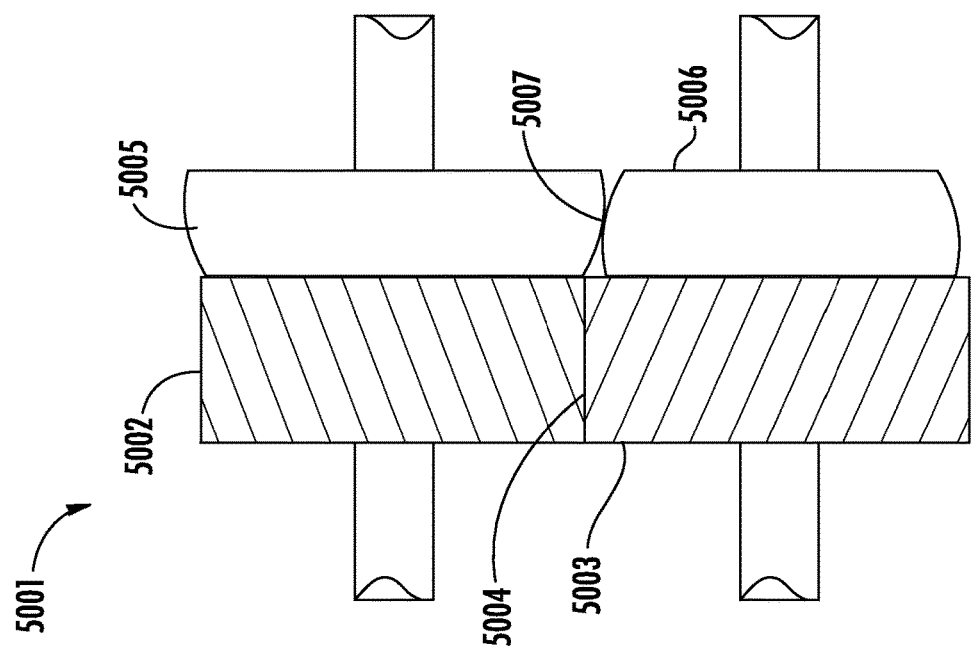
FIG. 46 is a cross-sectional view of an embodiment of a gear set having meshing teeth and a contacting traction surfaces.

Referring now to FIG. 46, in certain embodiments, a gear set 5001 includes a first gear 5002 coupled to a second gear 5003 through a helical tooth interface 5004.

In certain embodiments, the first gear 5002 may be provided with a first tapered traction roller 5005 integral to one side of the first gear 5002. The second gear 5003 may be provided with a second tapered traction roller 5006 coupled to the first tapered traction roller 5005. The first tapered roller 5005 and the second tapered roller 5006 form a traction surface 5007, and operate in principle similar to the traction engagement described in FIG. 1. In certain embodiments, the helical tooth interface 5004 provides axial force support to the gear set 5001 to thereby enable torque transfer through the traction surface 5007.

During operation of the gear set 5001, the first gear 5002 and the second gear 5003 transfer torque between rotating components at a predetermined gear ratio. The first tapered traction roller 5005 and the second tapered traction roller 5006 operate to mitigate any backlash in the helical tooth interface 5004 as well as mitigation of gear noise, vibration, etc.

Figure 47:
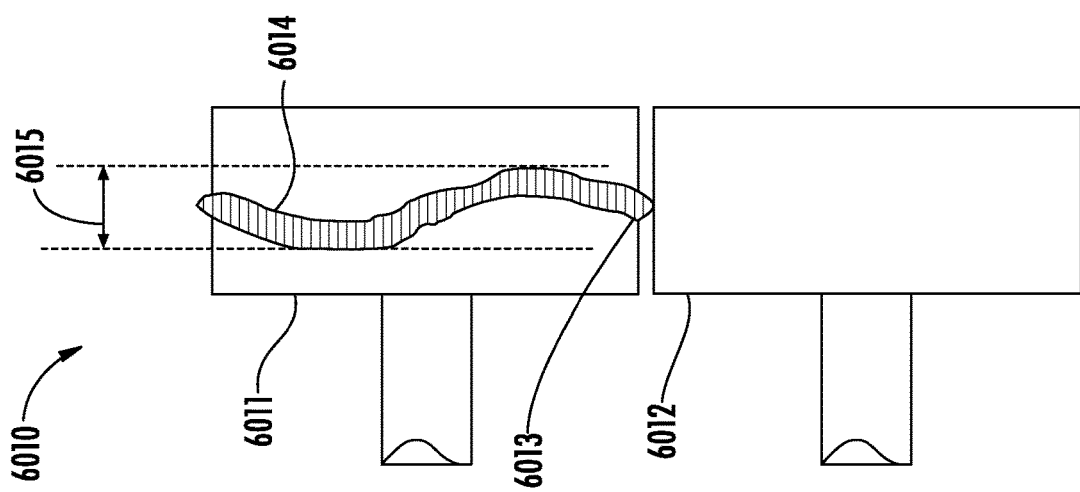
FIG. 47 is a cross-section view of a contacting traction surfaces having a non-uniform profile.

Referring now to FIG. 47, in certain embodiments, a traction drive 6010 includes a first traction roller 6011 contacting a second traction roller 6012 at a traction contact 6013. It should be appreciated that the traction drive 6010 may be a simplified representation of any power transmission device utilizing traction as a means for power transmission. The first traction roller 6011 and the second traction roller 6012 are formed with non-uniform outer periphery surfaces so that the traction contact 6013 moves with respect to the outer peripheral surface of the first traction roller 6011 and the second traction roller 6012, respectively. As shown in FIG. 47, a traction contact path 6014 represents the location on the surface of the first traction roller 6011 that contacts the second traction roller 6012, and vice versa. In certain embodiments, the traction contact path 6014 may be a non-linear pattern having a peek to valley distance 6015 that may be less than the width of the first traction roller 6011. In certain embodiments, the traction contact path 6014 corresponds to a raised traction surface formed on the outer periphery of the first traction roller 6011.

In certain embodiments, the axial location of the raised traction surface with respect to the outer periphery may be non-linear. During operation of the traction drive 6010, the non-uniform traction contact path 6014 promotes traction fluid entrainment for the traction contact 6013, which improves durability, power capacity, and thermal stability, among other benefits. In certain embodiments, the outer periphery of the first traction roller 6011 has a crowned shaped that may be non-uniform around the circumference of the first traction roller. In certain embodiments, the outer periphery of the second traction roller 6012 has a crowned shaped that may be non-uniform around the circumference of the second traction roller 6012.

While various embodiments of the presently disclosed subject matter have been described above, it should be understood that they have been presented by way of example, and not limitation. It will be apparent to persons skilled in the relevant art(s) that the disclosed subject matter may be embodied in other specific forms without departing from the spirit or essential characteristics thereof. The embodiments described above are therefore to be considered in all respects as illustrative, not restrictive.

What may be claimed is:

1. An electric hybrid powertrain, comprising:
   an engine;
   a first motor-generator;
   a second motor-generator;
   a first traction drive transmission operably coupled to the first motor-generator and the second motor-generator, the first traction drive transmission including a first ring member, a first rotatable traction roller carrier, and a first sun member;
   a first clutch configured to selectively couple the first ring member to a ground; and
   a second clutch configured to selectively couple the first ring member and the first motor-generator.

2. The electric hybrid powertrain of claim 1, wherein the second motor-generator is coupled to the first sun member.

3. The electric hybrid powertrain of claim 1, further comprising a third clutch configured to selectively couple the engine to the first motor-generator.

4. The electric hybrid powertrain of claim 3, wherein the electric hybrid powertrain is configured to operate in at least one of an electric mode and a series hybrid mode.

5. The electric hybrid powertrain of claim 4, wherein, in the series hybrid mode, the first clutch and the third clutch are engaged.

6. The electric hybrid powertrain of claim 4, wherein, in the electric mode, the first clutch or the second clutch are engaged.

7. The electric hybrid powertrain of claim 4, wherein the electric hybrid powertrain is configured to operate in an output split mode wherein the second clutch and the third clutch are engaged.

8. The electric hybrid powertrain of claim 1, further comprising a second traction drive transmission including a second ring member selectively coupled to the first sun member, a second rotatable traction roller carrier operably coupled to the first rotatable traction roller carrier, and a second sun member operably coupled to the second motor-generator.

9. The electric hybrid powertrain of claim 1, wherein the first traction drive transmission is a simple traction drive planetary device.

10. An electric hybrid powertrain, comprising:
    an engine;
    a first motor-generator;
    a second motor-generator;
    a first traction drive transmission including a first ring member operably coupled to the engine, a first rotatable traction roller carrier, and a first sun member operably coupled to the first motor-generator; and
    a second traction drive transmission including a second ring member selectively coupled to the first sun member, a second rotatable traction roller carrier operably coupled to the first rotatable traction roller carrier, and a second sun member operably coupled to the second motor-generator;
    wherein the second ring member is selectively coupled to ground through a second clutch.

11. The electric hybrid powertrain of claim 10, wherein the second ring member is selectively coupled to the first sun member through a first clutch.

12. An electric hybrid powertrain, comprising:
a first motor-generator;
a second motor-generator;
a planetary traction transmission including a ring member, a planet carrier operably coupled to an engine, and a sun member coupled to the first motor-generator;
a transfer traction drive transmission operably coupled to the second motor-generator and the ring member; and
a one-way clutch coupled to the engine and the planet carrier.

13. The electric hybrid powertrain of claim 12, wherein the planetary traction transmission is a simple planetary traction device.

14. The electric hybrid powertrain of claim 13, wherein the planetary traction transmission is provided with conical traction rollers supported in the planet carrier.

15. The electric hybrid powertrain of claim 12, wherein the transfer traction drive transmission is an off-set type traction drive transmission.

16. The electric hybrid powertrain of claim 12, wherein the ring member functions as an output member.

\* \* \* \* \*